US012661537B2

(12) United States Patent
Hrouzek et al.

(10) Patent No.: US 12,661,537 B2
(45) Date of Patent: Jun. 23, 2026

(54) FALL PROTECTION SHUTTLE APPARATUS AND METHODS OF USING THE SAME

(71) Applicant: HONEYWELL SAFETY PRODUCTS USA, INC., Charlotte, NC (US)

(72) Inventors: Jan Hrouzek, Demborice (CZ); Vaclav Hruza, Brno, NC (US); Mehmet Koru, Brno, NC (US); Tanguy Prevot, Brno, NC (US)

(73) Assignee: Honeywell Safety Products USA, Inc., Latham, NY (US)

( * ) Notice: Subject to any disclaimer, the term of this patent is extended or adjusted under 35 U.S.C. 154(b) by 1046 days.

(21) Appl. No.: 17/806,658

(22) Filed: Jun. 13, 2022

(65) Prior Publication Data

US 2023/0398383 A1 Dec. 14, 2023

(51) Int. Cl.
*A62B 35/00* (2006.01)

(52) U.S. Cl.
CPC ................................ *A62B 35/0081* (2013.01)

(58) Field of Classification Search
CPC . A62B 35/0081; A62B 35/0062; A62B 35/00; A62B 35/0068
See application file for complete search history.

(56) References Cited

U.S. PATENT DOCUMENTS 7,708,116 B2 * 5/2010 Martin ..................... A62B 1/14 182/8
8,584,797 B2 * 11/2013 Krauss .................... E06C 7/187 182/36
10,449,400 B2 * 10/2019 Roth ...................... A62B 35/04
11,865,379 B2 * 1/2024 Liu ....................... F16D 63/008
(Continued)

FOREIGN PATENT DOCUMENTS

CN 205031807 U 2/2016
CN 110538396 A 12/2019
CN 211357511 U 8/2020
(Continued)

OTHER PUBLICATIONS

Extended European Search Report Mailed on Feb. 5, 2024 for EP Application No. 23177888, 16 page(s).

*Primary Examiner* — David E Martinez
(74) *Attorney, Agent, or Firm* — Fredrikson & Byron, P.A.

(57) ABSTRACT

Various embodiments are directed to shuttle apparatuses for fall protection and methods of using the same. In various embodiments, the shuttle apparatus comprise a shuttle housing configured for dynamic engagement relative to a guide member; an adjustable guide wheel assembly configured for selective rotation between an unlocked position and a locked position, wherein rotating the adjustable guide wheel assembly between the locked position and the unlocked position comprises moving a button assembly relative to the shuttle housing along a button slot defined by the shuttle housing such that a wheel axle element is rotated between the locked and unlocked positions; wherein the adjustable guide wheel assembly being in the unlocked position corresponds to the shuttle apparatus being in an unlocked configuration defined by at least a portion of the shuttle apparatus being configured for selective movement between an installed configuration and a detached configuration relative to the guide member.

20 Claims, 10 Drawing Sheets

(56) References Cited

U.S. PATENT DOCUMENTS

2022/0203144 A1 6/2022 Liu et al.

FOREIGN PATENT DOCUMENTS

| | | | |
|---|---|---|---|
| CN | 112007296 | A | 12/2020 |
| CN | 113650803 | A | 11/2021 |
| DE | 202009013672 | U1 | 3/2011 |
| EP | 3906973 | A1 | 11/2021 |
| EP | 3906974 | A1 | 11/2021 |
| WO | 2011/055301 | A2 | 5/2011 |

* cited by examiner

FALL PROTECTION SHUTTLE APPARATUS AND METHODS OF USING THE SAME

FIELD OF THE INVENTION

Various embodiments described herein relate generally to fall protection systems and, more particularly, to fall protection shuttle apparatuses.

BACKGROUND

From recreation to survival devices, fall protection devices are instrumental in preserving the safety of users during traversal of uncertain conditions and heights. In order to operate effectively, protection devices must be able to freely travel along a guide member to allow freedom of movement, while remaining secured relative to the guide member to ensure that a user connected to the protection device remains operatively coupled to the guide member throughout the length of the guide member. Applicant has identified a number of deficiencies and problems associated with current fall protection devices. Through applied effort, ingenuity, and innovation, many of these identified problems have been solved by the methods and apparatus of the present disclosure.

BRIEF SUMMARY

Various embodiments are directed to shuttle apparatuses for fall protection and methods of using the same. In various embodiments, a shuttle apparatus may comprise A shuttle apparatus for fall protection, the shuttle apparatus comprising: a shuttle housing configured for dynamic engagement relative to a guide member such that the shuttle housing is secured relative to the guide member and movable along a length of the guide member; an adjustable guide wheel assembly configured for selective rotation between an unlocked position and a locked position based at least in part on a user interaction with a button assembly, wherein rotating the adjustable guide wheel assembly between the locked position and the unlocked position comprises moving at least a portion of the button assembly relative to the shuttle housing along a button slot defined by the shuttle housing such that a wheel axle element of the adjustable guide wheel assembly is rotated between the locked position and the unlocked position; wherein the adjustable guide wheel assembly being in the unlocked position corresponds to the shuttle apparatus being in an unlocked configuration defined by at least a portion of the shuttle apparatus being configured for selective movement between an installed configuration and a detached configuration relative to the guide member.

In various embodiments, the adjustable guide wheel assembly may comprise a wheel axle adjustment rod having a central rod axis defining an axis of rotation such that the wheel axle adjustment rod is configured for rotation in one or more rotational directions about the central axis rod based at least in part on the user interaction with the button assembly of the adjustable guide wheel assembly; wherein a first rod end of the wheel axle adjustment rod is connected to the wheel axle element. In various embodiments, the wheel axis element may be rigidly connected to the first rod end of the when axle adjustment rod, such that the wheel axle element is configured for rotation about the central rod axis of the wheel axle adjustment rod along with the wheel axle adjustment rod. In various embodiments, the wheel axle element may be connected to the wheel axle adjustment rod in an at least substantially perpendicular configuration, such that the wheel axle element defines a range of rotational motion that is defined within a rotational plane that is at least substantially perpendicular to the central rod axis of the wheel axle adjustment rod.

In various embodiments, the button assembly may comprise a pull button assembly comprising a pull button rod extending from a proximal end rigidly connected to an outer surface of the wheel axle adjustment rod to a distal end, wherein the pull button assembly further comprises a pull button dynamically engaged with the distal end of the pull button rod and configured for receiving user engagement to facilitate the user interaction with the pull button assembly. In various embodiments, the pull button rod may be arranged in an at least substantially perpendicular configuration relative to the central rod axis of the wheel axle adjustment rod. In various embodiments, the pull button rod may extend through the button slot of the shuttle housing such that the adjustable guide wheel assembly being rotated between the locked position and the unlocked position comprises at least a portion of the pull button rod between the proximal end and the distal end being moved between a first slot end and a second slot end of the button slot, wherein the locked position of the adjustable guide wheel assembly is defined by the pull button assembly being arranged with the pull button rod extending from the wheel axle adjustment rod in a first direction such that the pull button dynamically engaged with the distal end thereof is positioned along a first exterior surface of the shuttle housing, the first exterior surface defining at least a portion of a lower end of the shuttle housing.

In various embodiments, the unlocked position of the adjustable guide wheel assembly may be defined by the pull button assembly being arranged with the pull button rod extending from the wheel axle adjustment rod in a second direction such that the pull button dynamically engaged with the distal end thereof is positioned along a second exterior surface of the shuttle housing, wherein the second direction is at least substantially perpendicular to the first direction. In various embodiments, the pull button assembly may further comprise a retention element configured to engage the pull button disposed outside of the shuttle housing in an at least substantially inward direction towards an exterior surface of the shuttle housing. In various embodiments, may further comprise a connector element configured to receive a fastener for operatively connecting the shuttle apparatus to a user; wherein at least a portion of the button slot is defined at a lower end of the shuttle housing such that, upon the shuttle apparatus being installed in an upright orientation relative to the guide member, the button assembly is positioned vertically below the connector element. In various embodiments, the button slot may comprise a slot length extending between a first slot end and a second slot end; and wherein rotating the adjustable guide wheel assembly between the locked position and the unlocked position comprises moving the at least a portion of the button assembly between the first slot end and the second slot end, wherein the unlocked position is defined by the at least a portion of the button assembly being disposed at the first slot end and the locked position is defined by the at least a portion of the button assembly being disposed at the second slot end.

In various embodiments, the shuttle apparatus may be configured such that the adjustable guide wheel assembly defines a range of rotational motion that extends between the locked position and the unlocked position; wherein the range of rotational motion of the adjustable guide wheel assembly is defined by an angle of rotation of at least substantially 90 degrees. In various embodiments, the wheel axle element may be configured to rotate throughout a wheel axle range of rotational motion defined within a rotational plane, wherein the slot length of the button slot is defined within a plane that is at least substantially parallel to the rotational plane within which the wheel axle range of rotational motion is defined. In various embodiments, the shuttle housing may further define one or more recessed button seats at one or more of the first slot end and the second slot end of the button slot, each of the one or more recessed button seats being configured for receiving a button element of the button assembly therein and, upon the button element being positioned with the one or more recessed button seat, at least partially restricting the button from movement along the slot length of the button slot.

In various embodiments, the one or more recessed button seats may comprise a first recessed button seat disposed at the first slot end and a second recessed button seat disposed at the second slot end, the first recessed button seat being configured to at least partially secure the button element in the unlocked position and the second recessed button seat being configured to at least partially secure the button element in the locked position.

In various embodiments, the adjustable guide wheel assembly may be configured such that a rotation of the pull button assembly through a pull button angle of rotation causes the wheel axle element to rotate through a wheel axle angle of rotation that is at least substantially equivalent to the pull button angle of rotation. In various embodiments, the shuttle apparatus may further comprise an orientation verification element dynamically engaged relative to the shuttle housing and the adjustable guide wheel assembly so as to be moveable between a disengaged position and an engaged position based at least in part on the orientation of the shuttle apparatus; wherein, in response to the shuttle being arranged in both the unlocked configuration and a vertically inverted orientation, the orientation verification element is configured to automatically move to the engaged position defined by a physical engagement of the orientation verification element with the adjustable guide wheel assembly based at least in part on one or more gravitational force; wherein the orientation verification element in the engaged position is configured to secure the adjustable guide wheel assembly in the unlocked by preventing the adjustable guide wheel assembly from rotating relative to the shuttle housing.

In various embodiments, the pull button assembly may further comprise a pull button arrangement indicator configured to provide a perceivable indication of a position the adjustable guide wheel assembly based at least in part on a relative arrangement of the pull button arrangement indicator with respect to the shuttle housing. In various embodiments, the selective adjustment of the shuttle apparatus between the locked configuration and the unlocked configuration may be defined by a dual-action, multi-directional engagement with the button assembly that causes the adjustable guide wheel assembly to be adjusted between the locked position and the unlocked position. In various embodiments, the locked configuration of the shuttle apparatus may correspond to effective width of adjustable guide wheel assembly being at least substantially greater than an opening width of an internal channel opening of the guide member such that the one or more guide wheels of the adjustable guide wheel assembly is configured to engage an internal channel surface of the guide member to prevent removal of the shuttle apparatus from the guide member, and the unlocked configuration of the shuttle apparatus corresponds to the effective width of adjustable guide wheel assembly being at least substantially less than the opening width of an internal channel opening of the guide member to enable movement of the shuttle apparatus through the internal channel opening to facilitate removal of the shuttle apparatus from the guide member at one or more positions along the length of the internal channel opening.

BRIEF DESCRIPTION OF THE DRAWINGS

Reference will now be made to the accompanying drawings, which are not necessarily drawn to scale, and wherein.

DETAILED DESCRIPTION

Figure 1:
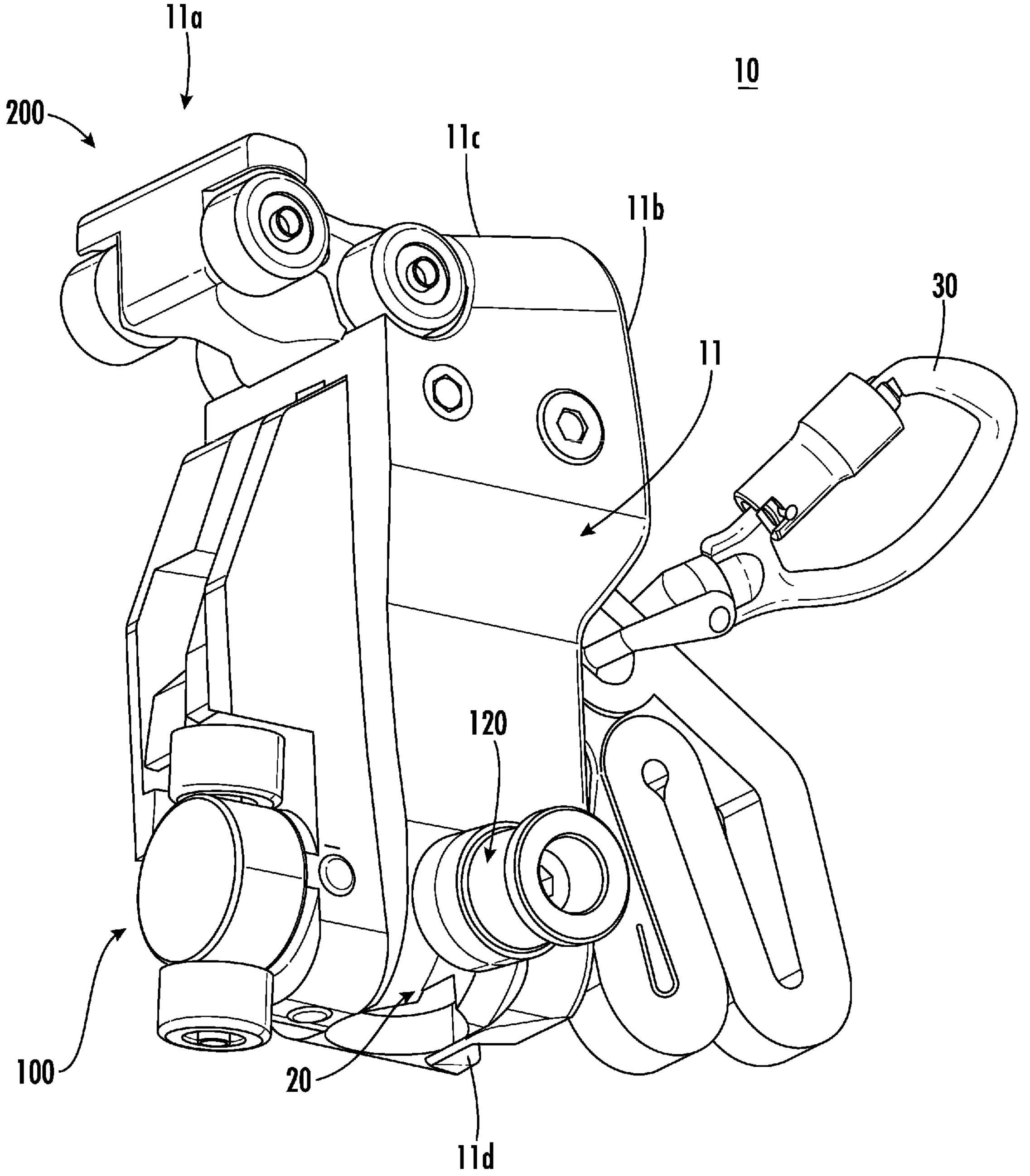
FIG. 1 illustrates a perspective view of an exemplary shuttle apparatus in accordance with various embodiments described herein are provided.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

It should be understood at the outset that although illustrative implementations of one or more aspects are illustrated below, the disclosed assemblies, systems, and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. While values for dimensions of various elements are disclosed, the drawings may not be to scale.

The words "example," or "exemplary," when used herein, are intended to mean "serving as an example, instance, or illustration." Any implementation described herein as an "example" or "exemplary embodiment" is not necessarily preferred or advantageous over other implementations.

The present disclosure provides various example shuttle apparatuses having an adjustable guide wheel assembly configured for selective adjustment between locked and unlocked position to facilitate installation and/or removal of the shuttle apparatus from a guide member at one or more intermediate portions defined along the length of the guide member thereof. Various embodiments described herein include a shuttle apparatus comprising an adjustable guide wheel assembly that is selectively configurable between a locked position and an unlocked position based on one or more user interactions with a pull button assembly configured to receive user engagement therewith and, in response, move along a pull button slot defined by the shuttle housing such that a wheel axle element of the adjustable guide wheel assembly is rotated between a lateral arrangement and a longitudinal arrangement corresponding to the locked position and the unlocked position, respectively.

In various embodiments, the shuttle apparatus comprises one or more locking mechanisms embodying a recessed button seat defined by the shuttle housing at a slot end of the of the pull button slot that are configured to secure the position of the pull button assembly relative to the slot end at which the recessed button seat is provided so as to secure the adjustable guide wheel assembly in either the locked or unlocked position. As described herein, the present invention is configured such that selectively adjusting the adjustable guide wheel assembly from the locked position to an unlocked position requires a dual-action, multi-directional user interaction with a pull button that is provided along an exterior portion of the shuttle housing so as to be accessible to a user. In various embodiments, the exemplary shuttle apparatus described herein is configured such that when the shuttle apparatus is arranged in an upright orientation and the adjustable guide wheel assembly thereof is provided in the locked position, the pull button used to facilitate user control of the adjustable guide wheel assembly between the locked and unlocked positions is positioned along a lower end of the shuttle housing, extending away from an exterior surface of the housing that is adjacent a slot end of the pull button slot in a longitudinal direction (e.g., in a downward vertical direction) such that during operation of the exemplary shuttle apparatus, the pull button does not physically engage, interfere, or otherwise obstruct the movement of the connector element and/or a fastener element connected thereto.

Further, in various embodiments, an exemplary shuttle apparatus described herein comprises an orientation verification element provided within the shuttle housing that is configured to selectively engage the adjustable guide wheel assembly when the adjustable guide wheel assembly is in the unlocked position and the shuttle apparatus is arranged in an incorrect orientation (e.g., an upside down and/or vertically inverted orientation) to prevent the adjustable guide wheel assembly from being adjusted to a locked position for operation in such an incorrect orientation. For example, the shuttle apparatus may be configured such that, upon being arranged in an incorrect orientation, the orientation verification element may be automatically reconfigured to an engaged position defined by a first portion of the orientation verification element being engaged with a wheel axle adjustment rod of the adjustable guide wheel assembly while a second portion of the orientation verification element is engaged with the shuttle housing.

As described herein, the present invention includes an exemplary shuttle apparatus comprising an adjustable guide wheel assembly configured to define an effective and robust attachment of the shuttle apparatus to a guide member during operation of the shuttle, while allowing for a user-friendly, safety-conscious selective adjustment of the shuttle between a locked configuration and an unlocked configuration such that the shuttle apparatus can be installed and/or detached relative to the guide member as needed at various intermediate positions along the length of the guide member that are defined in between guide member ends, and/or member segment breaks, and/or shuttle installation/removal slots distributed intermittently along the length of the guide member.

FIG. 1 illustrates a perspective view of an exemplary shuttle apparatus in accordance with various embodiments described herein are provided. In particular, FIG. 1 illustrates a perspective view of an exemplary shuttle apparatus configured to facilitate a secure connection between a guide member wearable and a retention device secured to a user (e.g., a wearable harness connected to an attachable interface such as a hook, a carabiner, and/or the like) while being moveable along the length of the guide member to allow for user movement therealong. As described in further detail herein, the exemplary shuttle apparatus 10 may be configured to engage a guide member (not shown) that is positioned, for example, on an elevated surface and may be configured to prevent one attached thereto from falling off the elevated surface by stabilizing the secure connection upon detecting a pull force in either a downward direction (e.g., a direction towards a ground surface) or a direction away from the portion of the guide member to which the shuttle apparatus is attached (e.g., in a fall direction during a "fall event"), thereby substantially mitigating the risk of detachment from the guide member.

In various embodiments, as illustrated in FIG. 1, an exemplary shuttle apparatus 10 may comprise a housing 11, one or more guide wheel assemblies, such as, for example, a first guide wheel assembly 100 and a second guide wheel assembly 200, and a connector element 30. In various embodiments, a connector element 30, such as, for example, a carabiner and/or the like, or any other appropriate fastening means, may be securely fastened to a brake assembly of the shuttle apparatus 10 such that when a force is applied to the connector element 30 (e.g., during a fall instance), the force is at least partially transmitted to the brake assembly, causing actuation thereof in order to prevent further motion of the shuttle apparatus along the guide member. The connector element 30 is configured to be directly or indirectly connected to a user, such as, for example, to a wearable harness and/or a fastener anchor component (e.g., a hook) disposed thereon.

In various embodiments, an exemplary housing 11 may embody an exterior shell comprising one or more sidewalls configured to define an interior housing portion therein, within which various components of the shuttle apparatus 10, such as, for example, the one or more guide wheel assemblies may be at least partially housed. Further, in various embodiments, a housing 11 may define a distal end 11*a*, a proximal end 11*b*, an upper end 11*c*, and a lower end 11*d*. An exemplary shuttle apparatus 10 is configured to be secured relative a guide member, such as, for example, a rail, a cable, and/or the like, such that, upon being installed relative to the guide member, the distal end 11*a* of the housing 11 is positioned at least substantially adjacent and/or within a portion of the guide member. The proximal end 11*b* may be defined by a second end of the housing 11 opposite the distal end 11*a* that is proximate the connector element 30. Further, as described herein, the shuttle apparatus 10 is configured to be installed at the guide member in an upright orientation, such that, in an exemplary circumstance wherein the guide member defines an at least substantially vertical configuration extending in a vertical direction, the upper end 11*c* is arranged above (e.g., as measured in the vertical direction) the lower end 11*d*. For example, in an exemplary circumstance wherein a guide member to which the shuttle apparatus 10 is secured defines an at least substantially vertical configuration and the lower end 11*d* of the housing 11 is arranged above (e.g., as measured in the vertical direction) the upper end 11*c*, the shuttle apparatus is installed at the guide member in an incorrect orientation.

Figure 2:
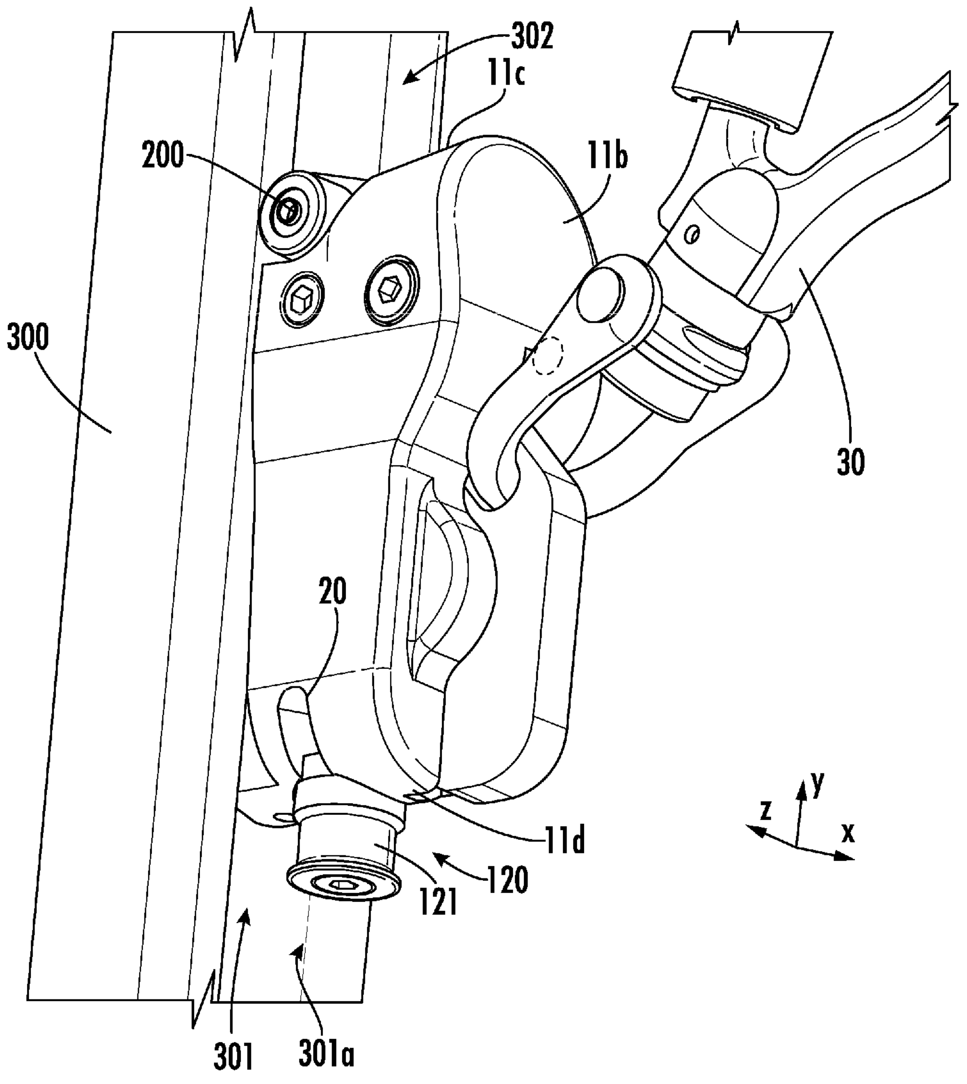
FIG. 2 illustrates a perspective view of an exemplary shuttle apparatus configured for dynamic engagement with a guide member in accordance with various embodiments described herein.

In various embodiments, an exemplary shuttle apparatus 10 may comprise one or more guide wheel assemblies configured to engage one or more surfaces of a guide member upon the shuttle apparatus 10 being installed relative to the guide rail and facilitate relative movement of the shuttle apparatus 10 along the length of the guide member. As illustrated in FIG. 1, the one or more guide wheel assemblies of an exemplary shuttle apparatus 10 may comprise a first guide wheel assembly 100 and a second guide wheel assembly 200, each comprising at least one guide wheel positioned along a distal end 11*a* of the housing 11. As illustrated, the first guide wheel assembly 100 may be positioned adjacent an upper end 11*c* of the housing 11 and the second guide wheel assembly 200 may be positioned adjacent a lower end 11*d* of the housing 11. As described herein, in various embodiments, the first and second guide wheel assemblies 100, 200 may be configured to freely travel along the guide member, such that the housing 11 remains dynamically engaged with the guide member (e.g., the guide member 300, as shown in FIG. 2) during operation. In such an exemplary configuration, the guide member, as described in further detail herein, may define a guide path embodying a range motion of the shuttle apparatus 10 defined along at least a portion of the length of the guide member, throughout which the shuttle apparatus 10 may travel during operation.

In various embodiments, a first guide wheel assembly 100 may adjustable between locked and unlocked position to facilitate installation and/or removal of the shuttle apparatus 10 from a guide member at an intermediate portion of the guide member defined along the length thereof, as described herein. For example, a first guide wheel assembly 100 may have a rotatable configuration relative to the housing 11 such that the wheel axle element having a first set of guide wheels positioned on respective ends thereof may be selectively rotated between a locked position and an unlocked position to selectively enable the operation of the shuttle apparatus 10 along the length of the guide member and the selective installation and/or uninstallation of the shuttle apparatus 10 relative to the guide member, respectively. For example, as described in further detail herein, the locked position of the first guide wheel assembly 100 may be defined by the wheel axle element being arranged in an at least substantially lateral configuration (e.g., extending in an at least substantially lateral direction); and an unlocked position defined by the wheel axle element being arranged in an at least substantially longitudinal configuration (e.g., extending in an at least substantially longitudinal direction). As an illustrative example, the first guide wheel assembly 100 of the exemplary shuttle apparatus 10 illustrated in FIG. 1 is shown in an unlocked position.

Further, as illustrated in FIG. 1 and described in further detail herein, the first guide wheel assembly 100 may be selectively adjusted between the locked and the unlocked position based on user interaction with a pull button assembly 120 of the first guide wheel assembly 100. For example, a user may move the pull button assembly 120 along a pull button slot 20 defined within the housing 11 to cause the first guide wheel assembly 100 to be reconfigured between the locked and unlocked position. In various embodiments, a pull button slot 20 defined by the housing 11 may embody an elongated opening extending through one or more sidewalls of the housing 11 defined at least substantially near a lower end 11*d*. As described herein, the pull button slot 20 may be configured to define the movement of pull button assembly of the first guide wheel assembly 100 as the first guide wheel assembly 100 is moved between the locked position and the unlocked position. The pull button slot 20 may be configured such that at least a portion of the pull button assembly of the first guide wheel assembly 100, such as, for example, a pull button axle, may be provided therethrough to facilitate a connection of a pull button knob disposed about an exterior of the housing 11 and one or components of the first guide when assembly 100 provided within the interior portion of the housing 11.

FIG. 2 illustrates a perspective view of an exemplary shuttle apparatus dynamically engaged with a guide member according to various embodiments described herein. In particular, FIG. 2 illustrates a perspective view of an exemplary shuttle apparatus 10 configured for selective installation and/or detachment relative to the guide member 300 and for, upon being installed relative to the guide member 300, movement along a length of the guide member 300 so as to define a guide path along which the shuttle apparatus 10 may be moved relative to guide member 300. For example, in various embodiments, a guide member 300 may comprise an elongated component having an internal channel into which a shuttle apparatus may be at least partially inserted and secured in an installed configuration along the length of the guide member, such as, for example, a guide rail and/or the like, or any other elongated material component suitable for dynamic engagement of the shuttle apparatus 10 along an internal channel thereof, as described herein. For example, an exemplary guide member 300 may comprise an internal channel 301 extending along the length of the guide member, the internal channel 301 being defined by one or more interior surfaces 301*a* of the guide member 300 that collectively define an interior portion within which the guide member 300 is configured to receive at least a portion of the shuttle apparatus 10 to facilitate the movement of the apparatus along the guide path. For example, the guide member 300 may define an internal channel opening 302 provided along an external surface of the guide member 300 through which the at least a portion of the shuttle apparatus 10, such as, for example, the first and/or second guide wheel assemblies 100, 200, may be received by the guide member 300 to facilitate installation of the shuttle apparatus 10 in an installed configuration relative to the guide member 300. In various embodiments, the internal channel opening 302 of the guide member 300 may be defined by an opening length defined in a longitudinal direction along the length of the guide member 300 (e.g., in a y-direction according to the exemplary orientation illustrated in FIG. 2) and an opening width defined in a lateral direction perpendicular to the length of the opening length of the guide member 300 (e.g., in an x-direction according to the exemplary orientation illustrated in FIG. 2).

In various embodiments, the shuttle apparatus 10 being provided in an installed configuration relative to the guide member 300 may comprise the shuttle assembly 10 being engaged with the guide member 300 such that the shuttle apparatus 10 may move along the length of the guide member 300 during operation thereof, but the movement of the shuttle apparatus 10 relative to the guide member 300 in a direction away from the guide member 300 (e.g., perpendicularly away from the internal channel 301) such that the shuttle apparatus 10 is secured to the guide member 300. For example, in various embodiments, an installed configuration of a shuttle apparatus 10 relative to a guide member 300 may be defined by the distal end 11*a* of the housing 11 being positioned within the internal channel 301 of the guide member 300 and the shuttle apparatus being arrange in a locked configuration, as described herein. For example, in such an exemplary configuration, as illustrated in FIG. 2, one or more guide wheels of a first guide wheel assembly and/or a second guide wheel assembly 200 of the shuttle apparatus 10 may be disposed within the internal channel 301 and positioned so as to engage one or more interior surfaces 301*a* of the internal channel 301 to facilitate movement of the shuttle apparatus 10 along the length of the of the guide member 300 and prevent the distal end 11*d* of the housing 11 from being removed from within the internal channel 301 of the guard rail 300.

In various embodiments, an exemplary shuttle apparatus 10 being provided in a detached configuration relative to the guide member 300 may comprise the shuttle assembly 10 being physically detached from the guide member 300 such that the distal end 11*a* of the housing 11 is positioned of the internal channel 301 and the movement of the shuttle apparatus 10 relative to the guide member 300 is not defined by a guide path extending along the length of the guide member 300.

As described herein, an exemplary shuttle apparatus 10 may be selectively arranged relative to the guide member 300 between an installed configuration and a detached configuration via an insertion and/or removal of the shuttle apparatus 10 through the internal channel opening 302. In various embodiments, an exemplary shuttle apparatus 10 may be configured to facilitate such installation and/or detachment of the shuttle apparatus 10 into and/or out of the internal channel 301 at one or more positions along the length of the internal channel opening 302 of the guide member 300 based at least in part on the adjustable guide wheel assembly thereof being selectively adjustable between a locked position and an unlocked position. For example, the shuttle apparatus 100 may be selectively configured in an unlocked configuration for installation and/or detachment relative to the guide member 300 based at least in part on the adjustable guide wheel assembly thereof being selectively arranged in an unlocked configuration.

As a non-limiting example, an exemplary shuttle apparatus in a detached configuration may be installed relative to a guide member 300 by first inserting a top end 11*c* of the housing 11 (e.g., the end of the housing 11 having the second, non-adjustable guide wheel assembly 200 arranged adjacent thereto) through the internal channel opening 302 of the guide member 300 in an at least substantially sideways configuration defined by the wheel axle of the second guide wheel assembly 200 being in a direction that is at least substantially parallel to the opening length of the internal channel opening 302. Upon the second guide wheel assembly 200 being inserted in a sideways orientation into the internal channel 301, the shuttle apparatus 10 may be rotated at least approximately 90 degrees such that the shuttle apparatus 10 is arranged in an upright orientation, as described herein, in a partially installed configuration defined by the second guide wheel assembly 200 being secured within the guide member 300 and the adjustable first guide wheel assembly being positioned outside of the guide member 300. Further, with the adjustable first guide wheel assembly in the unlocked position, the lower end 11*c* of the housing 11 may be moved toward the internal channel 301 until the one or more guide wheels and the wheel axle element of the adjustable first guide wheel assembly, as described herein, pas through the internal channel opening 302 and are disposed within the internal channel 301 of the guide member 300. In various embodiments, the shuttle apparatus 10 may be configured such that, upon being arranged in such an exemplary arrangement, the adjustable first guide wheel assembly may be selectively adjusted from the unlocked position to the locked position so as to define the adjustment of the shuttle apparatus 10 from the unlocked configuration relative to the guide member 300 to a locked configuration, as described herein. Upon the shuttle apparatus 10 being selectively reconfigured from the unlocked configuration to the locked configuration illustrated in FIG. 2, such as, for example, as a result of a user interaction with the pull button 121 of the pull button assembly 120 causing at least a portion of the pull button assembly 120 to be rotated along the pull button slot 20 defined by the housing 11, the shuttle apparatus 10 may be secured relative to the guide member 300 so as to define an installed configuration relative thereto. In various embodiments, an exemplary shuttle apparatus 10 in an installed configuration may be detached from the guide member 300 by executing the aforementioned actions in reverse sequential order, including selectively adjusting the adjustable guide wheel assembly from the locked position to the unlocked position in order to allow for the shuttle apparatus to be detached from the guide member 300 at any position along the opening length of the internal channel opening, such as, for example, at one or more intermediate positions defined along the length of the guide member 300 in between guide member ends, and/or member segment breaks, and/or shuttle installation/removal slots distributed intermittently along the length of the guide member 300.

Figure 3:
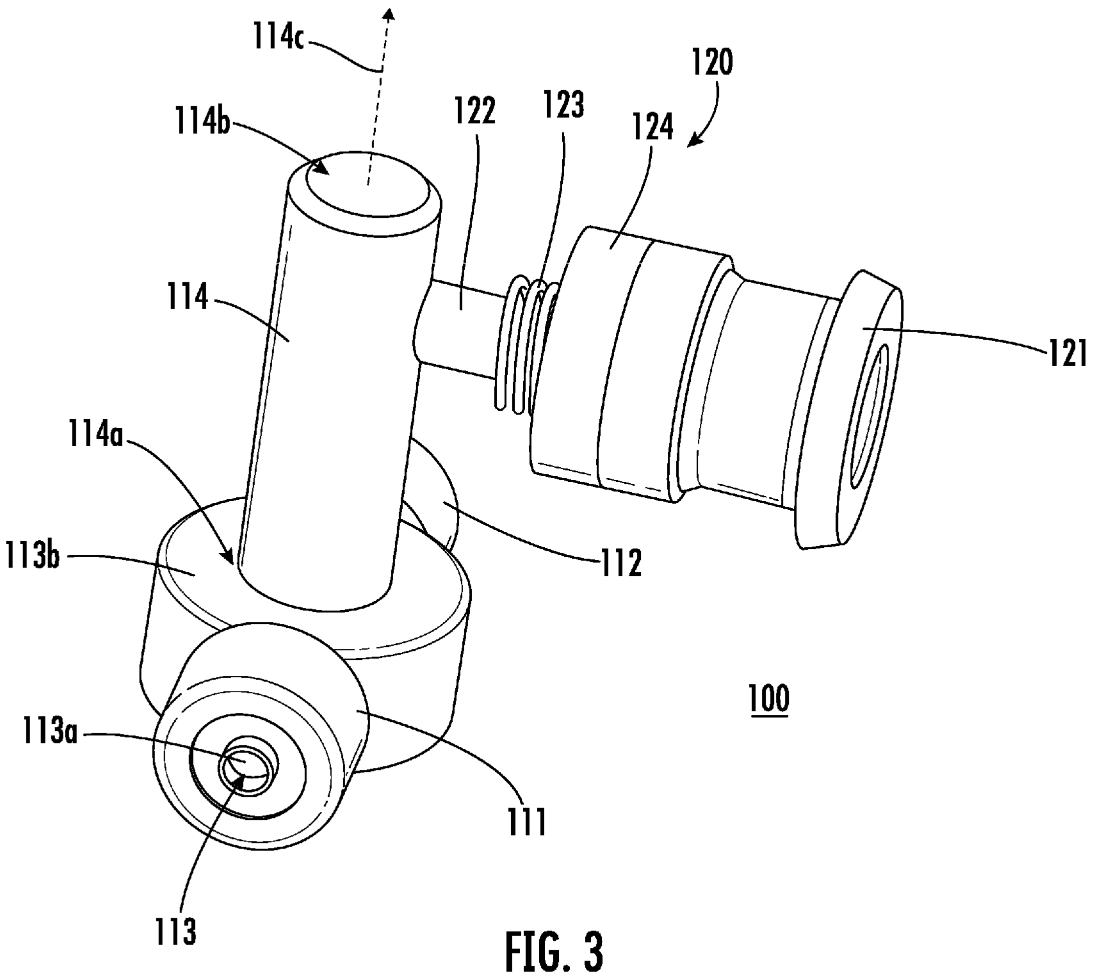
FIG. 3 illustrates a perspective view of various components of an exemplary guide wheel assembly of a shuttle apparatus in accordance with various embodiments described herein.

As an illustrative example, FIG. 3 illustrates a perspective view of various components of an exemplary guide wheel assembly of a shuttle apparatus in accordance with various embodiments described herein. In particular, FIG. 3 illustrates an exemplary first guide wheel assembly 100 configured to be selectively adjustable apparatus between a locked and unlocked position relative to the housing 11 of an exemplary shuttle to facilitate installation and/or removal of the shuttle apparatus relative to a guide member. In various embodiments, the first guide wheel assembly 100 may comprise a first set of guide wheels, a wheel axle element 113, a wheel axle adjustment rod 114 rigidly connected the wheel axle 113 and configured to facilitate arrangement of the wheel axle element 113 between a locked position and an unlocked position based on a rotation of the wheel axle adjustment rod 114 about a central rod axis 114*c* thereof, and a pull button assembly 120 operatively connected to the wheel axle adjustment rod 114 such that the rotation of the wheel axle adjustment rod 114 (e.g., and the wheel axle 113 rigidly connected thereto) is controlled based at least in part on user interaction with the pull button assembly 120.

For example, as illustrated, in various embodiments the first guide wheel assembly 100 may comprise set of guide wheels including a first guide wheel 111 and a second guide wheel 112 configured to be secured at opposing lateral ends of the wheel axle element 113 such that the first and second guide wheels 111, 112 are configured to rotate about the axis of rotation defined by a central axis of the wheel axle element 113. In various embodiments, the wheel axle element 113 may be embodied by a single axle rod element extending between a first lateral end configured to receive a first guide wheel 111 and a second opposing lateral end configured to receive a second guide wheel 112. Alternatively, or additionally, the wheel axle element 113 may be embodied as two distinct wheel axles, such as, for example, a first wheel axle 113_a_ configured to receive the first guide wheel 111 and a second wheel axle (not shown) configured to receive the second guide wheel 112, wherein the two separate axles are arranged coaxially and extend in opposing lateral directions from a central axle element 113_b_ such that the first and second guide wheels 111, 112 are independently rotatable along the same axis of rotation defined by the respective wheel axles to which the wheels are attached.

In various embodiment, the wheel axle adjustment rod 114 may comprise a rigid rod element defining a central rod axis 114_c_ and having a rod length extending between opposing rod ends thereof (e.g., first rod end 114_a_, second rod end 114_b_). In various embodiments, the wheel axle adjustment rod 114 may be connected to the wheel axle element 113 at a first rod end 114_a_ and, further, may be connected to the pull button assembly 120 at a portion of the wheel axle adjustment rod 114 that is at least substantially proximate the second rod end 114_b_. For example, as illustrated in FIG. 3, the wheel axle adjustment rod 114 may be rigidly connected to the wheel axle element 113 (e.g., a central axle element 113_b_ positioned between the first and second guide wheels 111, 112) at a first rod end 114_a_ such that the length of the wheel axle adjustment rod 114 is arranged perpendicularly to the length of the wheel axle element 113. For example, the first guide wheel assembly 100 may be configured such that a rotation of the wheel axle adjustment rod 114 about an axis of rotation defined by the central rod axis 114_c_ thereof causes the wheel axle element 113 to be similarly rotated about the central rod axis 114_c_ of the wheel axle adjustment rod 114. For example, the wheel axle element 113 may be connected to the wheel axle adjustment rod 114 such that the central axis of the wheel axle element 113 (e.g., defined in a direction extending between the first and second guide wheels 111, 112) exhibits a range of rotational motion (e.g., a wheel axle range of rotational motion) that is defined within a plane that is perpendicular to the central rod axis 114_c_ of the wheel axle adjustment rod 114 (e.g., the axis of rotation thereof). For example, as described herein, the range of rotational motion of the wheel axle element 113 may be defined between a locked position and an unlocked position, such that the adjustment of the first guide wheel assembly 100 between the locked position and the unlocked position is defined by the rotation of the wheel axle element 113 within the rotational plane defined in a perpendicular direction relative to the rod length of the wheel axle adjustment rod 114.

Further, in various embodiments, as illustrated, the pull button assembly 120 may be connected to the wheel axle adjustment rod 114 at a position along the length of the wheel axle adjustment rod 114 defined at least substantially proximate the second rod end 114_b_ (e.g., the rod end defined opposite to the wheel axle element 113 connected to the wheel axle adjustment rod 114 at a first rod end 114_a_). In various embodiments, the pull button assembly 120 may be configured to facilitate the selectively adjustable configuration of the 100, wherein the 100 may be retained in a desired position and/or selectively moved (e.g., rotated) between the locked and unlocked positions based at least in part on the arrangement of the pull button assembly 120 relative to the housing (e.g., the pull button slot) of the shuttle apparatus. For example, at least a portion of the pull button assembly 120 may be connected to the wheel axle adjustment rod 114 such that the rotation of the wheel axle adjustment rod 114 about the central rod axis 114_c_ and the corresponding rotation of the wheel axle element 113 throughout the range of rotational motion is caused by a user interaction with the pull button assembly 120, as described herein.

As illustrated in FIG. 3, the pull button assembly 120 of an exemplary adjustable guide wheel assembly 100 may comprise a button element 121, a pull button rod 122, and a retention element 123. In various embodiments, the pull button rod 122 may comprise a rigid rod element defining having a rod length extending from a proximal end that is rigidly connected to the wheel axle adjustment rod 114 (e.g., at least substantially proximate the second rod end 114_b_) and an opposing distal end at which the pull button 121 is disposed. For example, as illustrated, the pull button assembly 120 may be configured such that the length of the pull button rod 122 extends from the proximal end rigidly connected to the wheel axle adjustment rod 114 in an outward direction perpendicularly away from the central rod axis 114_c_ of the wheel axle adjustment rod 114 and to a distal end of the pull button rod 122. For example, in such an exemplary circumstance, the length of the pull button rod 122 is defined in a direction at least substantially perpendicular to that of the length of wheel axle adjustment rod 114. Further, in various embodiments, as illustrated, the length of the pull button rod 122 may be defined in a direction that is at least substantially perpendicular to both the length of wheel axle adjustment rod 114 and the length of the wheel axle element 113, wherein each length is defined in a respective direction.

In various embodiments, the first guide wheel assembly 100 may be configured such that a user interaction with the pull button assembly 120 defined by a force applied to the pull button assembly 120 (e.g., the pull button 121) that causes a movement of the pull button rod 122 along the length of the pull button slot of the shuttle apparatus housing, as described herein, may correspond to the wheel axle adjustment rod 114 being rotated about the axis of rotation defined by the central rod axis 114_c_ thereof. For example, the pull button rod 122 may be rigidly connected to an outer surface of the wheel axle adjustment rod 114 that is configured to rotate about an axis of rotation defined by central rod axis 114_c_. In various embodiments, a user engagement of the pull button assembly 120 may be defined by a force, such as, for example, a pulling force and/or a pushing force, being applied to the pull button assembly 120 (e.g., the pull button 121) in a direction that is at least substantially perpendicular to the length of the pull button 122 and the central rod axis 114_c_. Such a user engagement with the pull button assembly 120 may result in an adjustment of the adjustable guide wheel assembly 100 between the locked position and the unlocked position based at least in part on the user engagement force being imparted on the pull button assembly 120 embodying a non-lateral torque, a moment, and/or the like that acts on the wheel axle adjustment rod 114, thus causing the wheel axle adjustment rod 114 to rotate about the central rod axis 114_c_ such that the pull button rod 122 rigidly secured to an outer surface thereof is rotated along with the wheel axle adjustment rod 114 in the rotational plane defined in a perpendicular direction relative to the rod length of the wheel axle adjustment rod 114. As such, the adjustable guide wheel assembly 100 being selectively adjusted (e.g., rotated) between the locked position and the unlocked position may correspond to the pull button rod 122 being rotated around the central rod axis 114_c_ (e.g., about a center of rotation defined therealong) such that the pull button rod 122 exhibits a pull button rod range of rotational motion that is defined within a plane that is perpendicular to the central rod axis 114_c_.

In various embodiments, as the adjustable guide wheel assembly 100 is moved between the locked and unlocked positions, such an exemplary rotation of the pull button assembly 120 through a pull button rod range of rotational motion may correspond to an at least substantially similar rotation of the wheel axle element 113 through a wheel axle range of rotational motion thereof. In such an exemplary configuration, based at least in part on each of the pull button rod 122 and the wheel axle element 113 being fixedly secured to the wheel axle adjustment rod 114, as the pull button rod 122 exhibits a rotation through a first angle of rotation defined along the pull button rod range of rotational motion, the wheel axle element 113 may exhibit a rotation through a second angle of rotation that is defined along the wheel axle range of rotational motion and at least substantially equivalent to the first angle of rotation defined by the rotation of the pull button rod 122. Further, in various embodiments, both the first angle of rotation and the second angle of rotation defined by the rotation of the pull button rod 122 and the wheel axle element 113, respectively, may be at least substantially equivalent to a third angle of rotation defined by the wheel axle adjustment rod 114 as it rotates about the central rod axis 114*c* thereof.

As described herein, user interaction with the pull button assembly 120 causes the wheel axle element 113 to rotate throughout the wheel axle range of rotational motion between an at least substantially longitudinal arrangement wherein the length of the wheel axle element 113 extends in an at least substantially longitudinal direction such that the first and second guide wheels 111, 112 define a longitudinally stacked configuration, and an at least substantially perpendicular lateral arrangement wherein the length of the wheel axle element 113 extends in an at least substantially lateral direction such that the first and second guide wheels 111, 112 define a laterally distributed configuration. The selective configuration of the wheel axle element 113 in the longitudinal or lateral arrangements described above, as determined by one or more user adjustments of the pull button assembly 120 relative to the shuttle apparatus housing (e.g., the pull button slot), may define the configuration of the shuttle apparatus (e.g., the adjustable guide wheel assembly 100) in the unlocked and locked positions, respectively.

In various embodiments, the pull button assembly 120 may comprise a pull button 121 configured for positioning at a distal end of the pull button rod 122 opposite the proximal end secured to the wheel axle adjustment rod 114. The pull button 121 of the pull button assembly 120 may define a distal end of the pull button assembly 120 (e.g., a distal end of the pull button rod 122) that is configured to receive user engagement therewith to facilitate the selective reconfiguration of the adjustable guide wheel assembly 100 that defines the adjustment of the shuttle apparatus between the locked and unlocked positions, as described herein. For example, in various embodiments, the pull button 121 may be configured for receiving a user engagement defined by one or more forces, such as, for example, a pushing force, a pulling force, and/or the like, being applied to the button 121 in one or more directions via one or more user interactions, and, further, causing the one or more user engagement forces imparted thereon to be transmitted to one or more adjacent components of the pull button assembly 120, such as, for example, the pull button rod 122 and/or the retention element 123. For example, an exemplary shuttle apparatus may be configured such that the pull button 121 of the adjustable guide wheel assembly 100 is arranged in an external position relative to the shuttle apparatus housing (e.g., at least substantially adjacent an exterior surface of the shuttle apparatus housing) so as to be accessible to a user for selective interaction therewith during operation of the shuttle apparatus.

In various embodiments, the pull button 121 may be dynamically engaged with the pull button rod 122 such that the pull button 121 is configured for movement relative to the pull button rod 122, such as, for example, along the length of the pull button rod 122. For example, the pull button assembly 120 may be configured such that at least a portion of the pull button 121 may be moved along a portion of the length of the pull button rod 122 that is at least substantially adjacent the distal end thereof. As an illustrative example, a pull button assembly 120 may be configured such that, in response to a user interaction with the pull button 121 causing a pulling force to be imparted on the pull button 121 in an outward direction (e.g., away from the proximal end of the pull button rod 122) that at least substantially parallel to the length of the pull button rod 122, the pull button 121 may be pulled (e.g., along the length of the pull button rod 122) from a nominal (e.g., resting and/or stabilized) position defined relative to the pull button rod 122 and translated along the length of the pull button rod 122 to an extended position in which the pull button 121 is positioned further away from the proximal end of the pull button rod 122, as compared to the aforementioned nominal position of the pull button 121.

In various embodiments, as illustrated in FIG. 3, the pull button assembly 120 of an exemplary adjustable guide wheel assembly may further comprise a retention element 123 that may be connected to the pull button 121 and configured to bias the pull button 121 towards the nominal position. In various embodiments, the retention element 123 may be connected to both the pull button 121 and the pull button rod 122 such that the movement of the pull button 121 along length of the pull button rod 122 between the nominal position and an engaged position (e.g., resulting from user engagement therewith) is affected by one or more retention element forces corresponding to the configuration of the retention element 123 that act on the pull button 121. For example, the one or more retention element forces generated by the retention element 123 and acting on the pull button 121 may embody pulling forces configured to pull the pull button 121 back towards a nominal position (e.g., in a direction at least substantially towards the proximal end of the pull button rod 122).

In various embodiments, the retention element 123 is configured to bias the pull button 121 such that the pull button 121 is predisposed to move towards a nominal position defined by a neutral, default, and/or otherwise stable state, such as, for example, a stable state wherein the pull button 121 positioned at a lateral end of the pull button slot is being pulled by the retention element 123 in an inward direction toward the proximal end of the pull button rod 122 such that the pull button 121 abuts against an exterior surface of the housing that is adjacent the pull button slot. For example, as described in further detail herein, the retention element 123 may be configured such that the pull button 121 being arranged in the nominal position may cause one or more frictional forces to be generated between the pull button 121 and the exterior housing surface engaged therewith, such that the position of the pull button 121 along the pull button slot is at least substantially maintained when no other external user interaction forces are acting on the pull button assembly 120. As described herein, in various embodiments, the retention element 123 engaged with the pull button 121 may be configured such that a dual-action, a multi-directional user interaction with the pull button 121 is required in order for a user to reconfigure the pull button rod 122 within the pull button slot (e.g., to selectively adjust the shuttle apparatus between the locked and unlocked positions).

Further, in various embodiments, as illustrated in FIG. 3, the pull button assembly 120 may comprise a pull button arrangement indicator 124 configured to provide a perceivable indication to a user of the position of the adjustable guide wheel assembly 100, such as, for example, whether the adjustable guide wheel assembly is in the locked position or the unlocked position, based at least in part on the arrangement of the pull button assembly 120 relative to the housing of the shuttle apparatus. For example, in various embodiments, the pull button arrangement indicator 124 may be associated with one of the locked position and the unlocked position and be moveable relative to the housing of the shuttle apparatus along with at least a portion of the pull button assembly 120, such as, for example the pull button 121, such that, upon the adjustable guide wheel assembly 100 being positioned in the position associated therewith (e.g., either the locked or unlocked position) the pull button arrangement indicator 124 may be perceivable to a user such that the user may recognize the perception of the pull button arrangement indicator 124 as an indication that the adjustable guide wheel assembly 100 is arranged in the position associated therewith. For example, the pull button arrangement indicator 124 may embody a portion of the pull button rod 122 and/or the pull button 121 that is configured to be revealed and/or otherwise become visible to a user upon the pull button assembly 120 being arranged in a particular configuration so as to function as an indicator to a user that the pull button assembly 120 is arranged in that particular configuration. For example, in various embodiments, the pull button arrangement indicator 124 may be configured to be indicative of the pull button 121 of the pull button assembly 120 being in an extended configuration, as described herein. For example, in such an exemplary circumstance, the pull button arrangement indicator 124 may define a portion of the pull button 121 that may be generally perceivable when the pull button is in an extended configuration and/or positioned in between the first and second slot ends of the pull button slot such that the pull button 121 is not secured within a recessed button seat defined at one of the first and second ends, such as, for example, a bottom end of a sidewall thereof positioned adjacent the bottom surface that is configured to engage the exterior surface of the housing in a nominal position as illustrated in FIG. 3.

Further, in various embodiments, the pull button arrangement indicator 124 may be configured to be indicative of the adjustable guide wheel assembly 100 being provided in an unlocked position. As a non-limiting example, the pull button arrangement indicator 124 may comprise a portion of the pull button rod 122 and/or the pull button 121 that, upon the pull button rod 122 of the pull button assembly 120 being arranged relative to the shuttle housing such that the arrangement of the adjustable guide wheel assembly 100 corresponds to the shuttle apparatus being in an unlocked configuration, the pull button arrangement indicator 124 may be visible to a user through a line of sight that extends through the pull button slot defined by the shuttle housing. For example, in such an exemplary configuration, the pull button arrangement indicator 124 may be visible during operation of the shuttle apparatus to a user positioned underneath the shuttle apparatus to function as an indication (e.g., a warning) that the shuttle apparatus is configured in a potentially dangerous unlocked position. As illustrated, in various embodiments, the pull button arrangement indicator 124 may have a distinct color from the other components of the pull button assembly 120 so as to provide a visual distinction between the pull button arrangement indicator 124 and the other shuttle components. Further, in various embodiments, the pull button arrangement indicator 124 may embody a first indicator having a first distinct color and a second indicator having a second distinct color, wherein the pull button arrangement indicator 124 is configured such that the first indicator is made visible when the pull button assembly 120 is arranged such that the adjustable guide wheel assembly 100 is in a locked position, and the second indicator is made visible when the pull button assembly 120 is arranged such the adjustable guide wheel assembly 100 is in an unlocked position.

Figure 4:
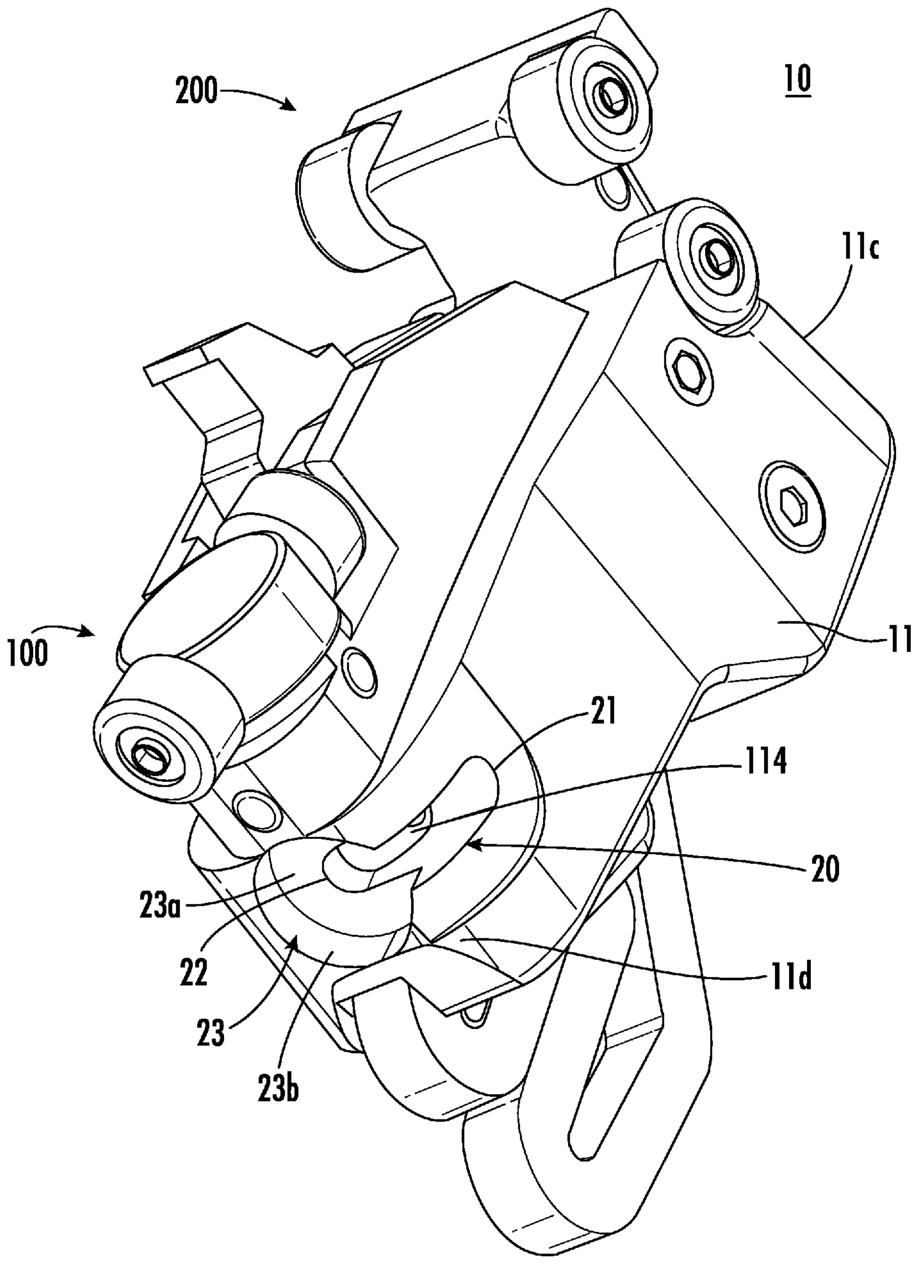
FIG. 4 illustrates a perspective view of an exemplary shuttle apparatus in accordance with various embodiments described herein.

In various embodiments, an exemplary shuttle apparatus may be selectively adjusted between a locked position and an unlocked position based at least in part on the arrangement of a pull button assembly of an adjustable guide wheel assembly relative to pull button slot defined by the housing of the shuttle apparatus. For example, FIG. 4 illustrates a perspective view of an exemplary shuttle apparatus in accordance with various embodiments described herein. In particular, the exemplary shuttle apparatus 10 comprises a shuttle housing 11 that includes a pull button slot 20 extending through the housing 11 between the interior housing portion defined within the housing 11 and one or more exterior surfaces of the housing 11 and being configured such that at least a portion of a pull button assembly (not shown) of the adjustable guide wheel assembly 100 may be moveably provided within the pull button slot 20. As illustrated in FIG. 4, the pull button slot 20 may comprise an elongated opening defined at least in part by a slot length that extends along one or more sidewalls of the housing 11 between a first slot end 21 and a second slot end 22. In various embodiments, the pull button slot 20 may be arranged such that at least a portion of the pull button slot 20 is defined along a lower end 11*d* of the housing 11. In various embodiments, as illustrated, the pull button slot 20 may be configured such that the slot length thereof is defined within a plane that is at least substantially parallel to the central rod axis of the wheel axle adjustment rod 114 and, further, at least substantially parallel to the rotational plane within which the wheel axis range of rotational motion of the wheel axle element of the adjustable guide wheel assembly is defined, as described herein.

In various embodiments, wherein the wheel axle adjustment rod 114 of the adjustable guide wheel assembly 100 is disposed within the housing 11 such that the proximal end of the pull button rod is connected thereto at an interface defined within the interior housing portion, the pull button rod may extend outward from the wheel axle adjustment rod 114 (e.g., to a distal end of the pull button rod at which the pull button is provided) through the through the pull button slot 20. In such an exemplary circumstance, as described herein, the pull button (not shown) disposed at the distal end of the pull button rod may be positioned outside of the housing 11 along an exterior housing surface defined proximate the pull button slot 20 such that the pull button rod extending through the pull button slot 20 facilitates a physical connection (e.g., physically communicative attachment such that one or more forces may be transmitted therebetween) between the pull button positioned external to the housing 11 and the wheel axle adjustment rod 114 positioned within the interior housing portion.

Further, in various embodiments, as illustrated, the pull button slot 20 may be defined along an at least substantially curved portion of the housing 11, such as, for example, a curved transition portion between the lower end 11*d* and a lateral sidewall of the housing that extends between the distal end 11*a* and the proximal end 11*b*. In such an exemplary circumstance, the pull button slot 20 may be configured such that an angular rotation of the pull button rod about the central rod axis of the wheel axle adjustment rod 114 (e.g., resulting from a user interaction with the pull button positioned outside of the housing 11) may correspond to the portion of the pull button rod disposed within the pull button slot 20 being moved in a corresponding rotational direction defined along the slot length of the pull button slot 20 towards one of the first and second slot ends 21, 22. For example, as described herein, the adjustable guide wheel assembly 100 may be configured such that a movement (e.g., a rotation) thereof relative to the housing 11 (e.g., about the central rod axis of the wheel axle adjustment rod 114) may be the result of a corresponding user-driven movement of the pull button assembly defined by the portion of the pull button assembly extending through the pull button slot 20, such as, for example, the pull button rod, being rotated so as to move along the slot length of the pull button slot 20 in either a first direction towards the first slot end 21 or a second direction that is opposite of the first direction and towards the second slot end 22. Accordingly, in various embodiments, the pull button slot 20 may be configured to at least partially define the range of motion of the adjustable first guide wheel assembly 100 between a locked position and an unlocked position based at least in part on a selective positioning of the pull button assembly at one or more positions along the slot length of the pull button slot 20.

For example, the configuration of the shuttle apparatus 10 in a locked configuration and/or an unlocked configuration, as described herein, may be based on a position of the pull button assembly (e.g., the portion of the pull button rod disposed within the pull button slot 20 and/or the pull button) within and/or along the pull button slot 20. As an illustrative example, the adjustable first guide wheel assembly 100 may be selectively configured in an unlocked position by a user selectively interacting with the pull button so as to cause the pull button rod extending through the pull button slot 20 to rotate along the slot length of the pull button slot 20 in a first rotational direction (e.g., towards the first slot end 21) until the pull button is positioned at least substantially adjacent the first slot end 21. Further, the adjustable first guide wheel assembly 100 may be selectively configured in a locked position by a user selectively interacting with the pull button so as to cause the pull button rod extending through the pull button slot 20 to rotate along the slot length of the pull button slot 20 in a second rotational direction (e.g., towards the second slot end 22 in the opposite direction of the first rotational direction) until the pull button is positioned at least substantially adjacent the second slot end 22.

In various embodiments, wherein the shuttle apparatus 10 is configured such that adjusting the adjustable first guide wheel assembly 100 between a locked position and an unlocked position comprises the wheel axis element thereof being rotated (e.g., about a central rod axis of the wheel axis adjustment rod 114) through an angle of rotation (e.g., at least substantially 90 degrees), the pull button slot 20 may extend along the housing 11 between the first slot end 21 and the second slot end 22 so as to define a pull button assembly range of rotational motion that extends through an angle of rotation that is at least substantially equivalent to angle of rotation defined between the locked and unlocked positions (e.g., the at least substantially the same 90 degrees relative to the axis of rotation (e.g., at least substantially 90 degrees). For example, the pull button slot 20 may be configured such that a rotation of a pull button rod along the slot length of the pull button slot 20 from one slot end (e.g., the first slot end 21) to the opposing slot end (e.g., the second slot end 22) sufficient to facilitate an adjustment of the shuttle apparatus 10 from an unlocked configuration to a locked configuration, or vice versa, may define an angular rotation of the pull button rod of at least approximately 90 degrees (e.g., relative to the central rod axis of the wheel axle adjustment rod 114) along the pull button slot 20.

Section Five

Figure 5A:
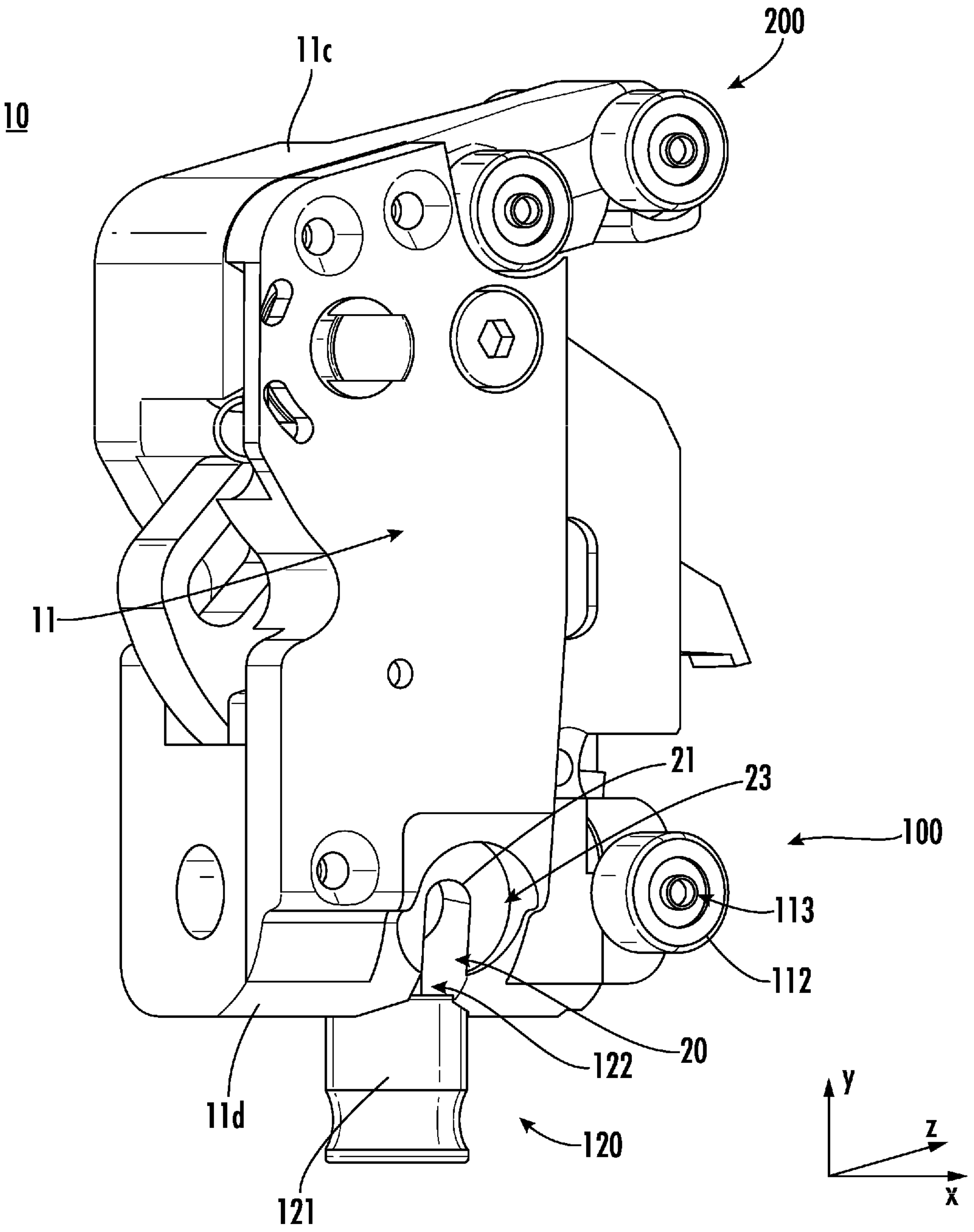
FIGS. 5A and 5B illustrate perspective views of exemplary shuttle apparatuses arranged in a locked configuration and an unlocked configuration, respectively, in accordance with various embodiments described herein.
Figure 5B:
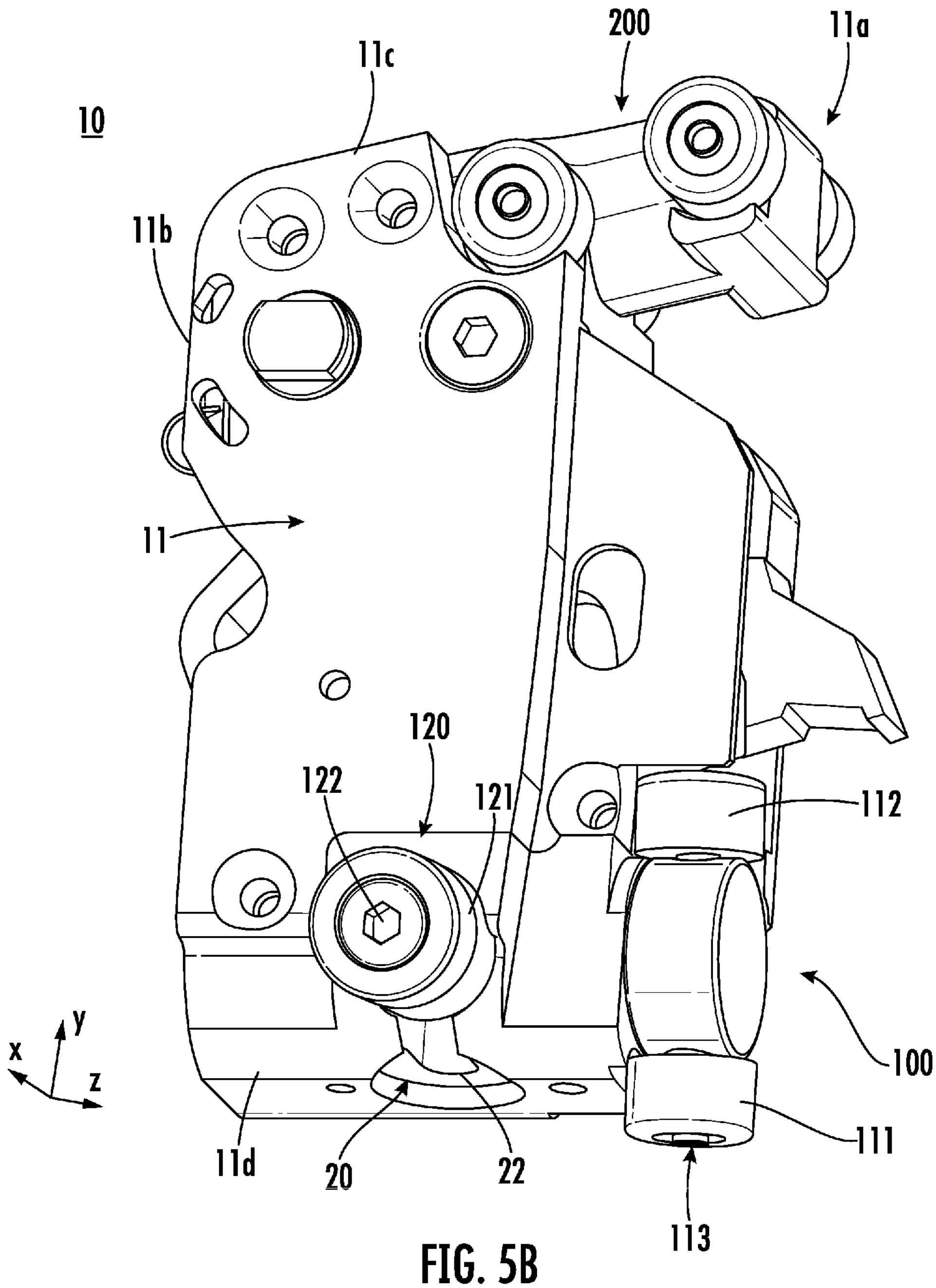

As illustrative examples, FIGS. 5A and 5B illustrate perspective views of exemplary shuttle apparatuses arranged in a locked configuration and an unlocked configuration, respectively, in accordance with various embodiments described herein. In particular, FIG. 5A illustrates an exemplary shuttle apparatus 10 in a locked configuration that is defined at least in part by an adjustable guide wheel assembly 100 thereof being selectively arranged in a locked position; and FIG. 5B illustrates the exemplary shuttle apparatus 10 in an unlocked configuration that is defined at least in part by the adjustable guide wheel assembly 100 thereof being selectively arranged in an unlocked position.

As illustrated in FIG. 5A, the exemplary shuttle apparatus comprises an adjustable first guide wheel assembly 100 that is dynamically engaged with the housing 11 and disposed at least substantially adjacent to a bottom portion thereof (e.g., at least substantially proximate to a lower end 11*d* of the housing). As illustrated, the adjustable first guide wheel assembly 100 of the exemplary shuttle apparatus 10 is provided in a locked position. As described herein, the locked position exhibited by an adjustable guide wheel assembly 100 may define an operational position of the wheel axle element 113 that may be exhibited during operation of the shuttle apparatus 10 in order to maintain the shuttle apparatus 10 in an installed configuration throughout operation.

In various embodiments, the locked position of the adjustable guide wheel assembly 100 may be defined by the wheel axle element 113 of the first guide wheel assembly 100 being arranged in an at least substantially lateral configuration, extending across a width of the guide member (e.g., guide member 300, including internal channel 301, as shown in FIG. 2), such as, for example, across an opening width of the channel opening defined by the guide member (e.g., in an x-direction according to the exemplary orientation illustrated in FIG. 5A), such that the guide wheels attached to opposing ends of the wheel axle element 113 (e.g., first guide wheel 111 and second guide wheel 112) are configured to engage one or more interior channel surfaces of the guide member to prevent the shuttle apparatus from being uninstalled (e.g., at least partially detached) from the guide member. For example, in such an exemplary configuration, the effective width of the adjustable first guide wheel assembly 100 may be defined by the lateral distance between opposing outer ends of the first guide wheel and the second guide wheel 112, respectfully (e.g., as measured along a central axis of the wheel axle element 113). The effective width of the adjustable first guide wheel assembly 100 arranged in the locked position, as measured in the lateral direction (e.g., in an x-direction according to the exemplary orientation illustrated in FIG. 5A), may be at least substantially greater than the opening width of the internal channel of the guide member such that a movement of the bottom portion of the shuttle apparatus 10 in an outward direction away from the guide member results in the first guide wheel and second guide wheel 112 of the first guide wheel assembly 100 physically abutting respective internal channel surfaces so as to restrict the bottom portion of the shuttle apparatus 10 from being further removed from within the internal channel of the guide member (e.g., being further moved through the internal channel opening in a direction away from the internal channel), thereby securing the bottom portion of the shuttle apparatus 10 in an installed configuration.

As illustrated in FIG. 5A, the adjustable guide wheel assembly 100 being provided in the locked position may be defined by pull button assembly 120 being arranged relative to the pull button slot 20 of the housing 11 such that the pull button rod 122 extends from the wheel axle adjustment rod 114 and through the pull button slot 20 in a longitudinal direction (e.g., in a y-direction according to the exemplary orientation illustrated in FIG. 5A) such that the pull button 121 provided at the distal end of the pull button rod 122 is positioned along an exterior housing surface defining at least a portion of the lower end 11*d* of the housing 11. For example, the pull button rod 122 may be positioned along the pull button slot 20 such that the pull button rod 122 extends through a second slot end defined at the lower end 11*d* of the housing 11 and the pull button 121 provided at the distal end of the pull button rod 122 may be positioned outside of the housing 11 along an exterior housing surface that is at least substantially adjacent the second slot end of the pull button slot 20 (e.g., the second slot end 22, as illustrated in FIG. 5B). As a non-limiting example illustrated in FIG. 5A, when the first guide wheel assembly 100 (e.g., the push assembly 120) is provided in a locked position, the pull button 121 may extend away from the external housing surface adjacent the second slot end in a longitudinal direction (e.g., in the negative y-direction according to the exemplary orientation illustrated in FIG. 5A) such that during operation of the exemplary shuttle apparatus 10, the pull button assembly 120 (e.g., the pull button 121) does not physically engage, interfere, or otherwise obstruct the movement of the connector element and/or a fastener element connected thereto.

As illustrated in FIG. 5B, the adjustable first guide wheel assembly 100 of the exemplary shuttle apparatus 10 may be selectively provided in an unlocked position. As described herein, the unlocked position exhibited by the adjustable guide wheel assembly 100 may define a non-operational (e.g., operationally hazardous) position of the wheel axle element 113 that may be exhibited prior to and/or subsequent to operation of the shuttle apparatus 10 in order to facilitate the installation and/or removal of the shuttle apparatus 10 into and/or away from the internal channel of a guide member.

In various embodiments, the unlocked position of the adjustable guide wheel assembly 100 may be defined by the wheel axle element 113 of the first guide wheel assembly 100 being arranged in an at least substantially longitudinal configuration, extending along a length of the guide member (e.g., guide member 300, including internal channel 301, as shown in FIG. 2), such as, for example, along an opening length of the channel opening defined by the guide member (e.g., in a y-direction according to the exemplary orientation illustrated in FIG. 5B). For example, the guide wheels attached to opposing ends of the wheel axle element 113 (e.g., first guide wheel 111 and second guide wheel 112) of the first guide wheel assembly 100 arranged in the unlocked position are configured so as not to engage the one or more interior channel surfaces of the guide member upon the bottom portion of the shuttle apparatus 10 being moved in an outward direction away from the guide member (e.g., out of the internal channel). For example, when the adjustable guide wheel assembly 100 is provided in the unlocked position, the effective width of the of the wheel axle element 113, as measured in the lateral direction (e.g., in an x-direction according to the exemplary orientation illustrated in FIG. 5B), may be at least substantially smaller than the opening width of the channel opening defined by the guide member such that the bottom portion of the shuttle apparatus 10 may be freely inserted into and/or removed from (e.g., installed and/or uninstalled) the interior channel of the guide member.

As illustrated in FIG. 5B, the adjustable guide wheel assembly 100 being provided in the unlocked position may be defined by pull button assembly 120 being arranged relative to the pull button slot 20 of the housing 11 such that the pull button rod 122 extends from the wheel axle adjustment rod 114 and through the pull button slot 20 in a lateral direction (e.g., in a x-direction according to the exemplary orientation illustrated in FIG. 5B) such that the pull button 121 provided at the distal end of the pull button rod 122 is positioned along an exterior housing surface defined by a lateral sidewall of the housing 11. For example, the unlocked position of the adjustable guide wheel assembly 100 may be defined by the pull button 121 being disposed in an unlocked button position along an exterior housing surface that is separated from the button position defined by the pull button 121 in the locked position by a separation angle of at least substantially 90 degrees, as measured about the central rod axis of the wheel axle adjustment rod. As illustrated, the pull button rod 122 may be positioned along the pull button slot 20 such that the pull button rod 122 extends through a first slot end defined at a lateral sidewall of the housing 11 and the pull button 121 provided at the distal end of the pull button rod 122 may be positioned outside of the housing 11 along an exterior housing surface that is at least substantially adjacent the first slot end of the pull button slot 20 (e.g., the first slot end 21, as illustrated in FIG. 5A). As a non-limiting example illustrated in FIG. 5B, when the first guide wheel assembly 100 (e.g., the push assembly 120) is provided in an unlocked position, the pull button 121 may extend away from the external housing surface adjacent the first slot end in a lateral direction (e.g., in the positive x-direction according to the exemplary orientation illustrated in FIG. 5B) that is at least substantially perpendicular to the longitudinal direction in which the pull button 121 extends when the adjustable guide wheel assembly 100 is in the locked position, as described above in reference to the embodiment illustrated in FIG. 5A. As described in further detail herein in reference to FIGS. 6A-6D, the adjustable guide wheel assembly 100 (e.g., the pull button assembly 120) may be selectively adjusted between the locked position illustrated in FIG. 5A and the unlocked position illustrated in FIG. 5B based at least in part on one or more user interactions with the pull button assembly 120 (e.g., the pull button 121) that cause the pull button assembly 120 to rotate about the central rod axis of the wheel axle adjustment rod such that the pull button rod 122 is moved along the length of the pull button slot 22 between the first and second slot ends 21, 22.

Referring back to the exemplary embodiment illustrated in FIG. 4, the housing 11 of an exemplary shuttle apparatus 10 may further define one or more recessed button seats provided at one or more slot ends of the pull button slot 20 (e.g., a first slot end 21 and/or a second slot end 22) and configured to receive a pull button in a nominal position therein to at least partially secure the position of the pull button along the pull button slot 20 (e.g., at the one or more slot ends thereof). For example, the housing 11 of the exemplary shuttle apparatus 10 illustrated in FIG. 4 defines a recessed button seat 23 along a lower end 11*d* at the second slot end 22 of the pull button slot 20. In various embodiments, a recessed button seat 23 may embody a material recess defined along a portion of the exterior surface of the housing 11 at least substantially adjacent the pull button slot 20 with at configuration corresponding at least in part to that of the pull button such that the pull button may be moved along the pull button rod to a nominal position within the material recess.

In various embodiments, a recessed button seat 23 may comprise a recessed button seat bottom surface 23*a* defined by a portion of the exterior surface of the shuttle housing 11 that is at least substantially adjacent (e.g., at least partially surrounding) the slot end at which the recessed button seat 23 is positioned (e.g., the second slot end 22, as illustrated in FIG. 4) and comprises a recessed configuration relative to an adjacent portion of the housing 11 exterior surface adjacent thereto. For example, the recessed button seat 23 may be defined at least in part by a seat depth defined by the distance between the recessed button seat bottom surface 23*a* and the adjacent portion of the housing 11 exterior surface, as measured perpendicularly from the recessed button seat bottom surface 23*a* in an outward direction (e.g., perpendicularly away from the recessed button seat bottom surface 23*a*) to the edge of the adjacent exterior surface that is defined by the pull button slot 20. The recessed button seat 23 may comprise one or more seat sidewalls 23*b* that extend between of the recessed button seat bottom surface and the portion of the housing 11 exterior surface adjacent to the recessed button seat 23. For example, in various embodiments wherein the seat sidewall(s) 23*b* define a perpendicular configuration relative to the recessed button seat bottom surface 23*a*, the seat depth of the recessed button seat 23 may be defined by the height of the one or more seat sidewall 23*b*.

In various embodiments, an exemplary shuttle apparatus may comprise a housing that defines a first recessed button seat and a second recessed button seat provided at a first slot end and a second slot end of the pull button slot, respectively, such that an adjustable guide wheel assembly of the shuttle apparatus may be secured in either a locked or unlocked position based at least in part on the pull button being disposed within either the first or second recessed button seats. For example, in such an exemplary configuration, upon an adjustable guide wheel assembly being configured in an unlocked position with a pull button rod thereof extending through the first slot end of the pull button slot, the pull button may be received within the first recessed button seat provided at the first slot end; and, further, upon the adjustable guide wheel assembly being configured in a locked position with the pull button rod thereof extending through the second slot end of the pull button slot, the pull button may be received within the second recessed button seat provided at the second slot end.

For example, as illustrated in FIG. 4, the recessed button seat 23 may be provided at the second slot end 22 such that, upon the adjustable guide wheel assembly 100 being configured in a locked position such that the pull button rod extends through the second slot end 22, the pull button may be received within the recessed button seat 23 provided at the second slot end 22. For example, a pull button positioned at the distal end of a pull button rod that is provided at the second slot end 22 of the pull button slot 22 may be pulled in towards the recessed button seat bottom surface 23*a* by one or more retention forces defining the biased configuration of the pull button assembly, as described herein. A retention element engaged with the pull button assembly may generate one or more retention forces that act on the pull button such that the pull button may be automatically received within the recessed button seat 23 upon a user disengagement with the pull button, as described herein. In such an exemplary circumstance, the nominal position of the pull button at the second slot end 22 may be defined by the pull button being physically abutted against the recessed button seat bottom surface 23*a*. In such an exemplary circumstance, the recessed button seat 23 may function as a locking mechanism configured to at least partially secure the position of the pull button at the second slot end 22 by restricting the movement along the slot length of the pull button slot 20 of the pull button disposed in the nominal position within the recessed button seat 23 so as to prevent the pull button from moving away from the second slot end 22 and towards the first slot end 21. For example, the one or more seat sidewalls 23*b* of the recessed button seat 23 may function as physical barrier preventing a pull button disposed in a nominal position against the recessed button seat bottom surface 23*a* from moving along the slot length of the pull button slot 20 towards the first slot end 21. In such an exemplary configuration, as described herein, the shuttle apparatus 10 may be configured such that, in order for a pull button disposed in a recessed button seat 23 (e.g., in a nominal position against the recessed button seat bottom surface 23*a*) defined at the second slot end 22 to be moved along the slot length of the pull button slot 20 towards the first slot end 21, the pull button must first be rearranged from the nominal position to an extended position defined by the pull button being removed from within the recessed button seat 23, as described herein.

Figure 6A:
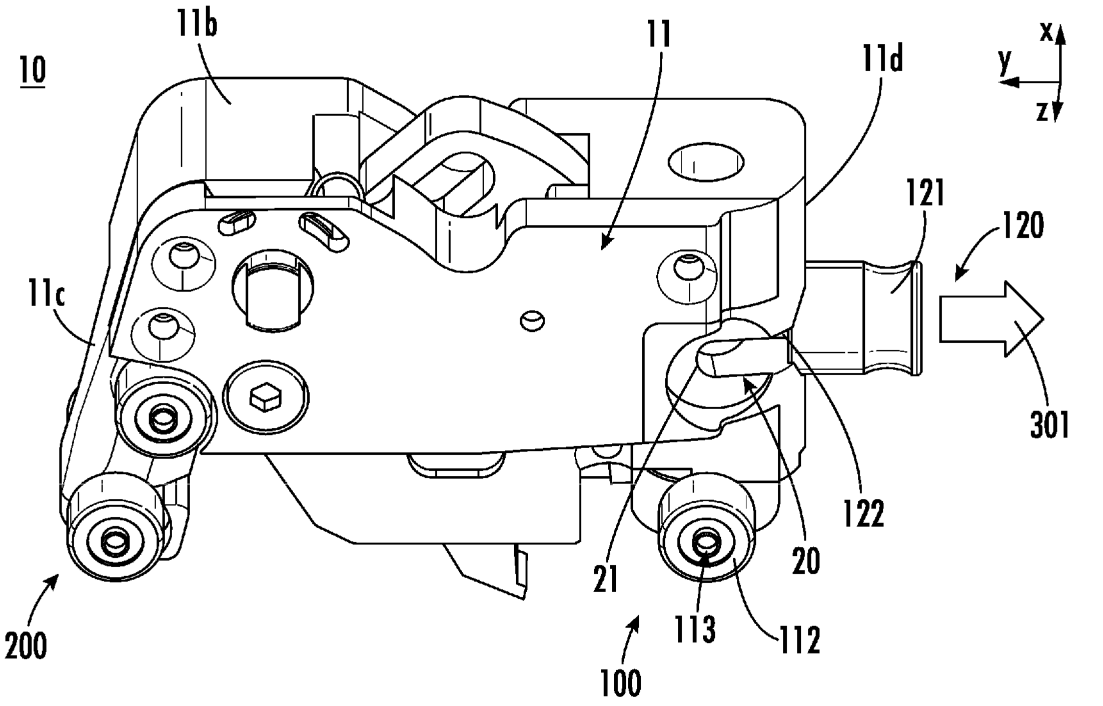
FIGS. 6A-6D illustrate various perspective views of exemplary shuttle apparatuses in accordance with various embodiments described herein.

In various embodiments, an exemplary shuttle apparatus may be configured such that the selective adjustment of the shuttle apparatus between a locked configuration and an unlocked configuration may be defined by a dual-action, multi-directional user interaction with a pull button assembly of an adjustable guide wheel assembly that causes the adjustable guide wheel assembly (e.g., a wheel axle element) to be rotated between a locked position and an unlocked position. As an illustrative example, FIGS. 6A-6D illustrate various perspective views of exemplary shuttle apparatuses in accordance with various embodiments described herein. In particular, FIGS. 6A-6D illustrate an exemplary shuttle apparatus 10 being reconfigured from a locked configuration to an unlocked configuration as a result of a multi-directional, dual action user interaction with a pull button assembly 120 of the adjustable guide wheel assembly 100. For example, FIG. 6A illustrates the exemplary shuttle apparatus 10 provided in the locked configuration defined by the adjustable guide wheel assembly 100 thereof being arranged in the locked position, wherein the pull button assembly 120 of the adjustable guide wheel assembly 100 is arranged relative to the pull button slot 20 such that the pull button rod 122 protrudes through the second slot end of the pull button slot 20 and the pull button 121 provided at the distal end of the pull button rod 122 is engaged with an exterior housing surface at the lower end 11*d* of the housing 11.

In various embodiments, the adjustable guide wheel assembly 100 may be secured in the locked position based at least in part on the pull button 121 being secured in a second recessed button seat defined at the second slot end such that the pull button 121 is restricted from movement along the slot length towards the first slot end 21 of the pull button slot 20. As described herein, the shuttle apparatus 10 may be configured such that a dual-action user interaction with the pull button assembly 120 (e.g., the pull button 121) comprising a first pull action and a subsequent rotation action is required in order to selectively adjust the adjustable guide wheel assembly 100 between the locked and unlocked positions. For example, as illustrated in FIG. 6A, a user interaction with an adjustable guide wheel assembly 100 provided in a locked position may be embodied at least in part by the pull button 121 of the pull button assembly 120 pulled and/or otherwise moved in an outward direction away from the exterior surface of the housing 11 (e.g., the recessed button seat within which the pull button 121 was disposed) by a user, such that a pulling force 301 is imparted on the pull button 121 in an at least substantially outward direction away from the housing 11 and/or the wheel axle adjustment rod (not shown) to which the pull button rod 122 is connected (e.g., in the negative y-direction, as illustrated in FIG. 6A). For example, the pulling force 301 may be defined in a direction that is at least substantially parallel to a central axis of the pull button rod 122, such that the pulling force 301 causes the pull button 121 to move relative to the pull button rod 122 along the length of the rod 122 in an outward direction away from the housing 11 (e.g., in the negative y-direction, as illustrated). The exemplary pulling force 301 may cause the pull button 121 to be moved from a nominal position (e.g., resting and/or stabilized position), as illustrated in FIG. 6A, in which the pull button 121 was being secured against an exterior surface of the housing 11 (e.g., via a retention element of the pull-button assembly 120) and/or positioned within a recessed button seat defined at the second end of the pull button slot 20 to an extended position, as illustrated in FIG. 6B, in which the pull button 121 is positioned away from the exterior surface of the housing 11 with which the pull button 121 was previously engaged in the nominal position.

As described herein, in various embodiments, the retention element (not shown) of the pull button assembly 120 may be configured to enable a configuration wherein a multi-directional, dual-action user interaction with the pull button 121 is required in order for a user to reconfigure the pull button rod 122 within the pull button slot so as to selectively adjust the shuttle apparatus between the locked and unlocked positions. In various embodiments, as described herein, the pull button assembly 120 of an exemplary shuttle apparatus 10 may be configured such that as the pull button 120 is moved from a nominal position to an extended positioned in response to a pulling force 301 being applied to the pull button 121, a retention element connected to pull button 121 may generate a retention force that acts on the pull button 121 in a direction opposing the motion of the pull button 121, such as, for example, towards the exterior surface of the shuttle housing 11 and/or the proximal end of the pull button rod 122. As described herein, the retention element of the pull button assembly 120 may be configured to bias the pull button 121 towards the nominal position in which the pull button 121 is pressed against the exterior surface of the housing 11. For example, a movement of the pull button 121 towards an extended position, as illustrated in FIG. 6B, may cause the retention element to be reconfigured such that the spring element is further expanded from a first expanded position to a second expanded position. In such an exemplary circumstance, as the retention element is expanded to the second expanded position, the retention element may at least substantially continuously apply a pulling force to the pull button 121 that opposes the pulling force 301 being applied to the pull button 121 by the user.

Figure 6B:
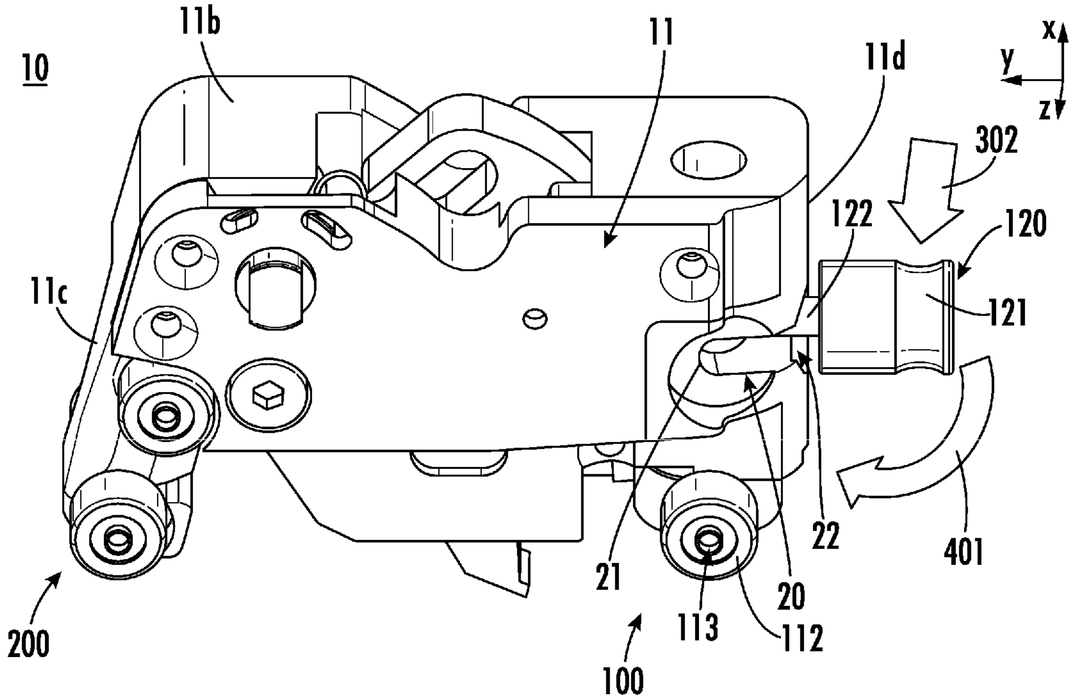

With reference to FIG. 6B, as a result of the pulling force 301 illustrated in FIG. 6A, the pull button 121 is shown in the extended position wherein the pull button 121 has been moved in an outward direction along the pull button rod 122 such that at least substantially all of the pull button 121 is removed from the recessed button seat. The exemplary shuttle apparatus 10 may be configured such that, upon the pull button 121 being arranged in an extended configuration, as illustrated, the pull button 121 may be freely moved along length of the pull button slot 20 by a user without a sidewall of the recessed button seat physically obstructing the pull button 121 from moving along the pull button slot 20 towards the first slot end. For example, in FIG. 6B, upon the pull button 121 being arranged in an extended configuration, as illustrated, the dual-action user interaction with an adjustable guide wheel assembly 100 may be further defined by a subsequent action in which the pull button 121 being pushed, pulled, and/or otherwise moved away from the second slot end of the pull button slot 20 by a user, such that a second force 302 is imparted on the pull button assembly 120 at the pull button 121 in a direction along the length of the pull button slot 20 at least substantially towards the first slot end 21. The pull button assembly 120 may be configured such that the second force 302 applied to the pull button 121 by the user may impart a non-lateral torque and a moment on the pull button rod 122 at the distal end thereof (e.g., via the pull button 121) that causes the pull button rod 122 to rotate about the central rod axis of the wheel axle adjustment rod, as described herein, in a rotational direction 401.

In various embodiments, the pull button slot 20 of the exemplary shuttle apparatus 10 may be configured such that the pull button rod 122 being rotated in the rotational direction 401 may correspond to the portion of the pull button rod 122 extending through the pull button slot 20 being moved from the second slot end of the pull button slot 20 at least substantially towards the first slot end 21. As described herein, the pull button rod 122 being rotated (e.g., with the wheel axle adjustment rod) in the rotational direction 401 about the central rod axis of the wheel axle adjustment rod from the second slot end of the pull button slot 20 along slot length towards the first slot end 21 may correspond to the adjustable guide wheel assembly 100 being selectively adjusted from the locked position to the unlocked position. For example, the second force 302 may be applied to the pull button 121 of the pull button assembly 120 until the pull button rod 122 has been along at least substantially the entire slit length of the pull button slot 20 such that the pull button 121 is positioned at least substantially adjacent the first slot end, as illustrated in FIG. 6C.

Figure 6C:
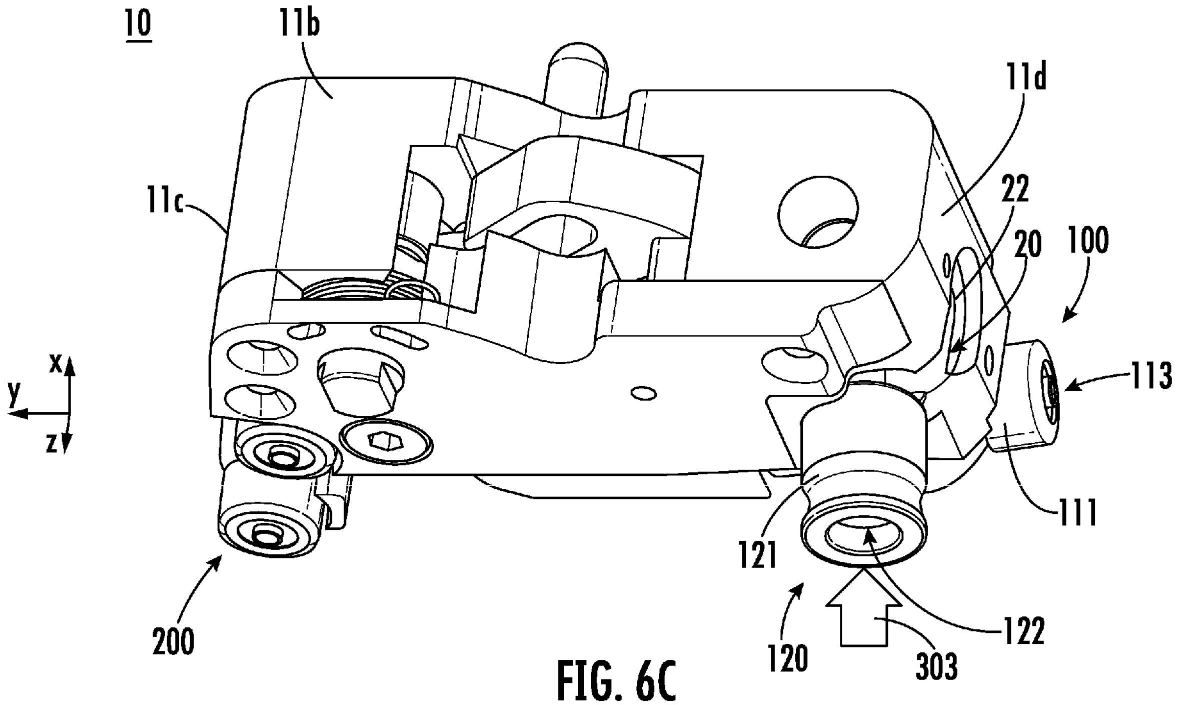

With reference to FIG. 6C, as a result of the second force 302 of the dual-action user interaction causing the pull button rod 122 to be rotated (e.g., about the central rod axis of the wheel axle adjustment rod rigidly connected thereto) in the rotational direction 401, as illustrated in FIG. 6B, the pull button 121 is shown in a position at least substantially adjacent the first slot end of the pull button slot 20 such that the pull button rod 122 dynamically engaged therewith extends through the first slot end of the pull button slot 20.

As a non-limiting example, the pull button assembly 120 may be configured such that when the pull button rod 122 is arranged to extend through the first slot end such that the adjustable guide wheel assembly 100 is provided in the unlocked position, the pull button 121 may extend away from an external housing surface defining at least a portion of a lateral sidewall of the shuttle housing 11 in a lateral direction (e.g., in the positive z-direction according to the exemplary orientation illustrated in FIG. 6C) that is at least substantially perpendicular to the longitudinal direction in which the pull button 121 extends when the adjustable guide wheel assembly 100 is in the locked position. As described herein, the adjustable guide wheel assembly 100 may be configured such that the pull button rod 122 of the pull button assembly 120 is rigidly connected to an outer surface of a wheel axle adjustment rod (not shown), which is rigidly connected to the wheel axle element 113 such that the aforementioned user interaction with the pull button 121 that causes a rotation of the pull button rod 122 from the second slot end 22 along the slot length of the pull button slot 20 in the rotational direction 401 (as shown in FIG. 4B) to the first slot end results in the wheel axle element 113 of the adjustable guide wheel assembly 100 being rotated through an equivalent angle of rotation so as to adjust the guide wheel assembly 100 from a lateral arrangement to a longitudinal arrangement. For example, the wheel axle element 113 may be provided in the longitudinal arrangement illustrated in FIG. 6C based at least in part on the rotation of the pull button rod 122 to the first slot end of the pull button slot 20 causing the wheel axle element 113 to rotate about the central axis rod of the wheel axle adjustment rod throughout a wheel axis range of rotational motion to the illustrated longitudinal arrangement.

For purposes of illustration, the exemplary pull button 121 is shown in FIG. 6C in an extended configuration relative to the pull button rod 122 such that the pull button 121 is not secured within the recessed button seat defined at the first slot end of the pull button slot 20, but rather arranged so as to be separated from the exterior surface of the housing 11 by a distance that is sufficient to enable the pull button 121 to clear the sidewalls of the recessed button seat without physical engagement therewith as the pull button 121 moves between the first and second slot ends. As described herein, the pull button assembly 120 may comprise a retention element configured to bias the pull button 121 towards a nominal position (e., away from an extended position). For example, as illustrated, the retention element of the pull button assembly 120 may be configured to generate a retention force 303 that acts on the pull button 121 such that the pull button 121 is configured to automatically move to a nominal position at the first slot end of the pull button slot 20 upon a user releasing and/or otherwise disengaging the pull button 121 (e.g., such that the pulling force 301 described in reference to FIG. 6A is at least substantially zero) when the pull button rod 122 is positioned at the first slot end of the pull button slot 20. As illustrated, the retention force 303 acting on the pull button 121 may be generated based at least in part on the retention element defining an expanded configuration when the pull button 121 is in the extended configuration.

Figure 6D:
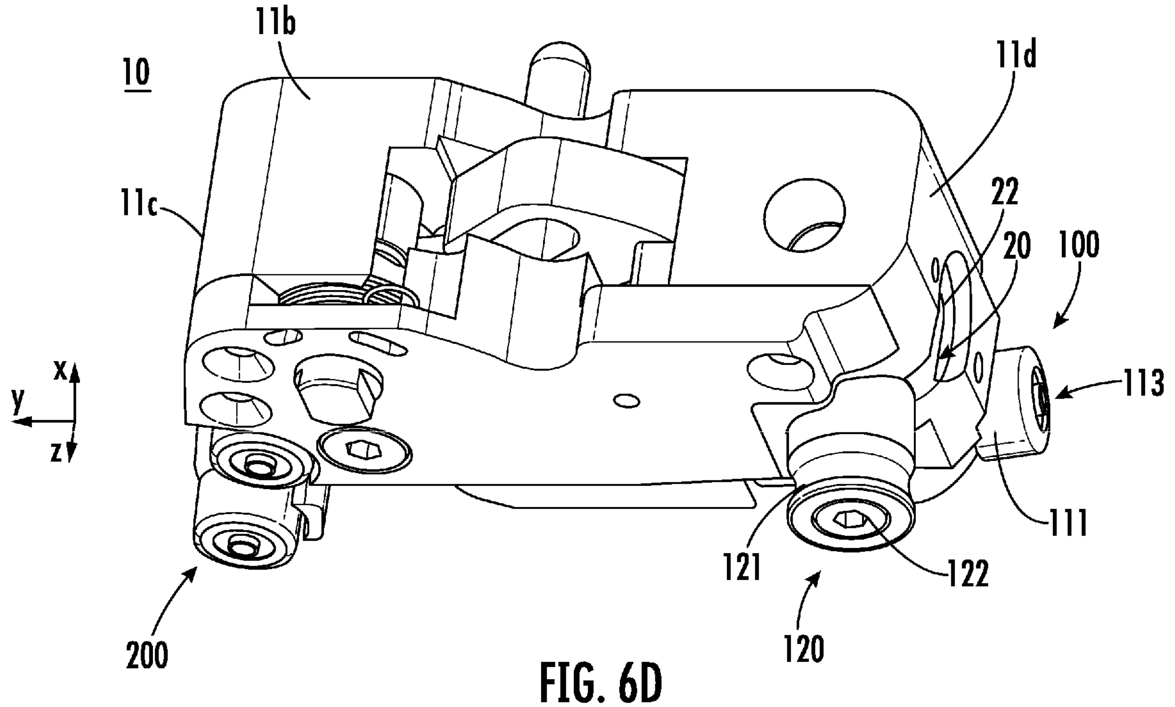

In various embodiments, the retention force 303 may comprise a spring force embodying a pulling force that acts on the pull button 121 to pull the pull button 121 in an inward direction from the extended position toward an exterior surface of the housing 11. The dynamic engagement of the pull button 121 relative to the pull button rod 122 may cause the retention force 303 to pull the pull button 121 in an inward direction at least substantially parallel to the pull button rod 122 (e.g., in a lateral direction, such as, for example, in the negative y-direction, as illustrated) such that the pull button 121 is moved from the extended position to a nominal position at least substantially adjacent the first slot end of the pull button slot. For example, the retention force acting on the pull button 121 may pull the pull button 121 from the extended position along the pull button rod 122 toward the proximal end of the pull button rod 122 disposed within the housing 11 until the pull button 121 physically abuts an exterior surface of the housing 11 that is at least substantially adjacent the first slot end of the pull button slot 20. In various embodiments, as illustrated in FIGS. 6C and 6D, as the pull button 121 is reconfigured from the extended position illustrated in FIG. 6C to the nominal position shown in FIG. 6D based at least in part on the retention force 303 generated by the retention element of the pull button assembly 120 acting on the pull button 121, the pull button rod 122 may at least substantially maintain its position within the pull button slot 20 (e.g., extending through the first slot end thereof) such that, upon the pull button 121 being pulled into the nominal position at the first slot end of the pull button slot 20, the adjustable guide wheel assembly 100 may be secured in the unlocked position so as to secure the shuttle apparatus 10 in the unlocked configuration. For example, the pull button 121 may be pulled into a nominal position within a recessed button seat defined by the housing 11 at the first slot end such that the pull button 121 is secured within the recessed button seat, thereby preventing the pull button rod 122 from moving in a second rotational direction (e.g., opposite the rotational direction 401 illustrated in FIG. 6B) towards the second slot end 22 and securing the adjustable guide wheel assembly 100 in the unlocked position illustrated in FIG. 6D. In various embodiments, the shuttle apparatus 10 may be configured such that, in order to move the adjustable guide wheel assembly 100 from the unlocked position illustrated in FIG. 6D to a locked position, a second dual-action user interaction may be required that includes a movement of the pull button 121 from the nominal position shown in FIG. 6D along the pull button rod 122 in a lateral direction away from the housing 11 to an extended position, (e.g., as illustrated in FIG. 6C).

Figure 7A:
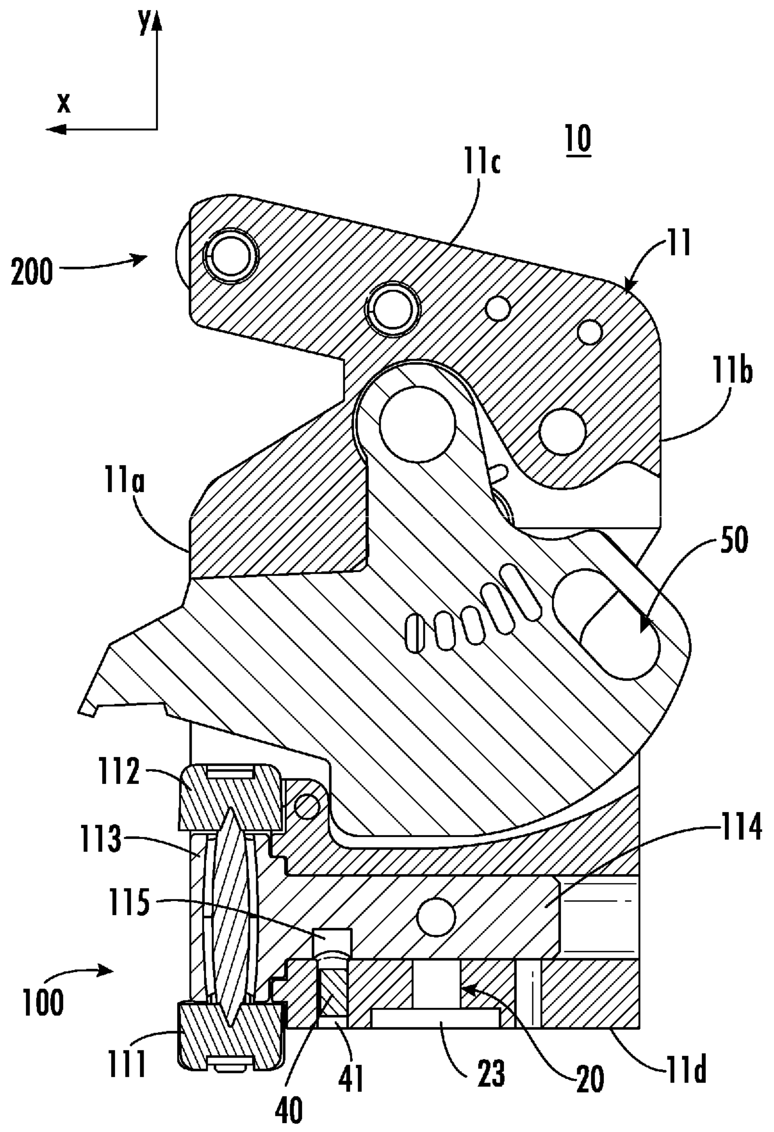
FIGS. 7A and 7B illustrate cross-sectional views of exemplary shuttle apparatuses installed on guide members in an upright orientation and an incorrect orientation, respectively, in accordance with various embodiments described herein.
Figure 7B:
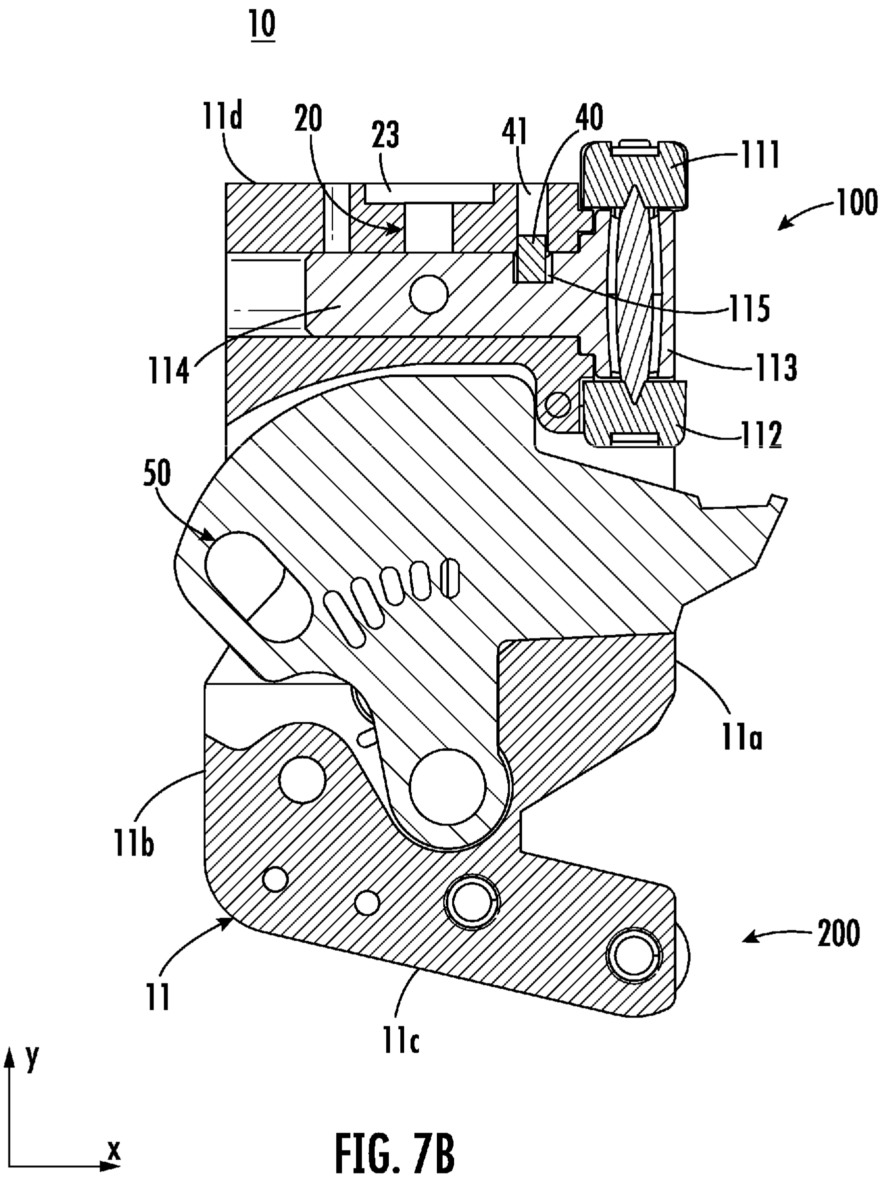

In various embodiments, an exemplary shuttle apparatus may further comprise an orientation verification element provided within the housing of the shuttle apparatus and configured to selectively engage an adjustable guide wheel assembly in an unlocked position upon the shuttle apparatus being arranged in an incorrect orientation (e.g., an upside down and/or vertically inverted orientation) to prevent the adjustable guide wheel assembly from being adjusted to a locked position for operation in such an incorrect orientation. FIGS. 7A and 7B illustrate cross-sectional views of exemplary shuttle apparatuses installed on guide members in an upright orientation and an incorrect orientation, respectively, in accordance with various embodiments described herein. In particular, FIG. 7A illustrates an exemplary shuttle apparatus 10 arranged in an upright orientation wherein the lower end 11*d* of the shuttle housing 11 is positioned vertically below the upper end 11*c* of the housing 11 (e.g., closer to a ground surface, as measured in a vertical direction defined by the y-direction in the orientation illustrated in FIG. 7A), and FIG. 7B illustrates the shuttle apparatus 10 arranged in an incorrect orientation wherein the lower end 11*d* of the shuttle housing 11 is positioned vertically above the upper end 11*c* of the housing 11 (e.g., further away from a ground surface, as measured in a vertical direction defined by the y-direction in the orientation illustrated in FIG. 7B). For example, in various embodiments, the upright orientation of the shuttle apparatus 10 may be defined by an orientation wherein, upon the shuttle apparatus 10 being installed relative to an at least substantially vertically configured guide member, the adjustable guide wheel assembly 100 of the shuttle apparatus 10 is disposed vertically below a connector element anchor 50 that is configured to receive a connector element (not shown) to facilitate the coupling of the connector element to the shuttle apparatus 10. Conversely, in various embodiments, an incorrect orientation of the shuttle apparatus 10 may be defined by the vertical inverse of the upright orientation, wherein the adjustable guide wheel assembly 100 is positioned vertically above the connector element anchor 50 of the shuttle apparatus 10.

In various embodiments, the orientation verification element 40 of exemplary shuttle apparatus 10 may be dynamically configured within the shuttle housing 11 (e.g., an orientation verification element retention opening 41 defined within the housing 11) such that the orientation verification element 40 may be moved between a disengaged position and an engaged position relative to the adjustable guide wheel assembly 100 based at least in part on a gravitational force acting thereon. For example, as illustrated in FIG. 7A, the orientation verification element 40 may comprise a pin, a rod, a tab, and/or the like configured for movement relative to (e.g., into and/or out of) an orientation verification element retention opening 41 comprising an opening in an internal surface of the housing 11 that extends from the internal housing portion to a depth defined within a sidewall of the housing 11. As illustrated, the orientation verification element retention opening 41 may have a configuration corresponding at least in part to that of the orientation verification element 40, such that the orientation verification element retention opening 41 is configured to receive the orientation verification element 40 therein to effectively retain the orientation verification element 40 in one or more directions while enabling the orientation verification element 40 to move freely along a central axis of the orientation verification element retention opening 41 in response to one or more gravitational forces acting on the orientation verification element 40 in a downward vertical direction (e.g., in the negative y-direction as defined in the orientation illustrated in FIGS. 7A and 7B), such as, for example, when the shuttle apparatus 10 is arranged in either an upright orientation or an incorrect orientation.

In various embodiments, the orientation verification element retention opening 41 may be defined by a depth that is at least substantially greater than or equal to the length of the orientation verification element 40, such that, in an exemplary circumstance wherein the shuttle apparatus 10 is provided in an upright orientation, the orientation verification element 40 may be at least substantially entirely housed within the orientation verification element retention opening 41 (e.g., such that no portion of the orientation verification element 40 protrudes from the orientation verification element retention opening 41 into the internal housing portion). In such an exemplary circumstance wherein the shuttle apparatus is provided in an upright orientation, as illustrated in FIG. 7A, one or more gravitational forces acting on the orientation verification element 40 may pull the orientation verification element 40 in a downward vertical direction (e.g., in the negative y-direction as defined in the orientation illustrated in FIG. 7A) such that the orientation verification element 40 is retained within the orientation verification element retention opening 41 in a disengaged position. For example, an orientation verification element 40 that is in the disengaged position, as illustrated in FIG. 7A, may be arranged to avoid physical engagement with the adjustable guide wheel assembly 100 such that the adjustable guide wheel assembly 100 of the shuttle apparatus 10 may be freely adjusted (e.g., rotated) from the unlocked position to a locked position in order to adjust the shuttle apparatus 10 to a locked configuration and facilitate installation of the shuttle apparatus 10 relative to a guide member, as described herein.

In various embodiments, the shuttle housing 11 may define an orientation verification element retention opening 41 that is arranged relative to the adjustable guide wheel assembly 100 such that, in an exemplary circumstance wherein the shuttle apparatus 10 is arranged in an incorrect orientation, as illustrated in FIG. 7B, the orientation verification element 40 may move from the disengaged position along a central axis of the orientation verification element retention opening 41 and to an engaged position defined by at least a portion of the orientation verification element 40 extending out of the orientation verification element retention opening 41 (e.g., into the internal housing portion defined within the housing 11) and being in physical contact with at least a portion of the adjustable guide wheel assembly 100. For example, as illustrated, in an engaged position, the portion of the orientation verification element 40 extending beyond the orientation verification element retention opening 41 and physically engaging the adjustable guide wheel assembly 100 may be received within a corresponding wheel assembly opening 115 defined along the wheel axle adjustment rod 114. In various embodiments, the wheel assembly opening 115 of the adjustable guide wheel assembly 100 may be configured to receive the at least a portion of the orientation verification element 40 protruding from the orientation verification element retention opening 41 when the shuttle apparatus 10 is arranged in an incorrect (e.g., vertically inverted) orientation. For example, in an exemplary configuration wherein the adjustable guide wheel assembly 100 is provided in an unlocked position, the wheel assembly opening 115 may be at least substantially coaxially aligned with the orientation verification element retention opening 41 defined by the housing 11.

Further, in various embodiments, wheel assembly opening 115 may be defined by a depth that extends from an outer surface of the wheel axle adjustment rod 114 in an inward direction towards the central rod axis of the wheel axle adjustment rod 114 in a direction at least substantially perpendicular thereto. In various embodiments, the depth of the wheel assembly opening 115 may be at least substantially less that the length of the orientation verification element 40 such that the orientation verification element 40 being provided in an engaged position is defined by a first portion of the orientation verification element 40 is provided within the wheel assembly opening 115 and a second portion of the orientation verification element 40 remaining positioned within the orientation verification element retention opening 41. For example, as illustrated in FIG. 7B, when the shuttle apparatus 10 is provided in an incorrect orientation, a gravitational force may act on the orientation verification element 40 to pull the orientation verification element 40 from the disengaged position and along the central axis of the orientation verification element retention opening 41 (e.g., towards the wheel assembly opening 115) to an engaged position at which the movement of the orientation verification element 40 may be stopped by a physical engagement with the wheel assembly opening 115 before the entire orientation verification element 40 is removed from the orientation verification element retention opening 41. As such, the shuttle apparatus 10 may be configured such that, upon being arranged in an incorrect orientation, an orientation verification element 40 may be automatically reconfigured to an engaged position defined by a first portion of the orientation verification element 40 being provided within the wheel assembly opening 115 and engaged with the wheel axle adjustment rod 114 while a second portion of the orientation verification element 40 (e.g., defined by an opposing end of the orientation verification element 40 as measured along the length thereof) is provided within the orientation verification element retention opening 41 and engaged with the shuttle housing 11.

The orientation verification element 40 may comprise an at least substantially rigid configuration such that, upon being provided in the engaged position with a first portion thereof being disposed within the wheel assembly opening 115 of the adjustable wheel axle assembly in an unlocked position and a second portion thereof being disposed in the orientation verification element retention opening 41 aligned with the wheel assembly opening 115, the rigidity of the orientation verification element 40 may prevent the wheel axle adjustment rod 114 from being rotated about the central rod axis thereof such that the adjustable guide wheel assembly 100 cannot be adjusted from the unlocked position to a locked position. A shuttle apparatus 10 having such an exemplary orientation verification element 40 may be configured to prevent the operation of the shuttle apparatus 10 in the incorrect orientation by preventing the adjustable guide wheel assembly 100 from being adjusted to the locked position, thereby preventing the shuttle apparatus 10 from being provided in a locked configuration and, thus, an installed configuration relative to a guide member.

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A shuttle apparatus for fall protection, the shuttle apparatus comprising:

a shuttle housing configured for dynamic engagement relative to a guide member such that the shuttle housing is secured relative to the guide member and movable along a length of the guide member;

an adjustable guide wheel assembly configured for selective rotation between an unlocked position and a locked position based at least in part on a user interaction with a button assembly, wherein when the adjustable guide wheel assembly is rotated between the locked position and the unlocked position, at least a portion of the button assembly is configured to move relative to the shuttle housing along a slot length extending between a first slot end and a second slot end of a button slot defined by the shuttle housing such that a wheel axle element of the adjustable guide wheel assembly is rotated between the locked position and the unlocked position;

wherein the adjustable guide wheel assembly being in the unlocked position corresponds to the shuttle apparatus being in an unlocked configuration defined by at least a portion of the shuttle apparatus being configured for selective movement between an installed configuration and a detached configuration relative to the guide member.

2. The shuttle apparatus of claim 1, wherein the adjustable guide wheel assembly comprises a wheel axle adjustment rod having a central rod axis defining an axis of rotation such that the wheel axle adjustment rod is configured for rotation in one or more rotational directions about the central axis rod based at least in part on the user interaction with the button assembly of the adjustable guide wheel assembly; wherein a first rod end of the wheel axle adjustment rod is connected to the wheel axle element.

3. The shuttle apparatus of claim 2, wherein the wheel axle element is rigidly connected to the first rod end of the when axle adjustment rod, such that the wheel axle element is configured for rotation about the central rod axis of the wheel axle adjustment rod along with the wheel axle adjustment rod.

4. The shuttle apparatus of claim 3, wherein the wheel axle element is connected to the wheel axle adjustment rod in an at least substantially perpendicular configuration, such that the wheel axle element defines a range of rotational motion that is defined within a rotational plane that is at least substantially perpendicular to the central rod axis of the wheel axle adjustment rod.

5. The shuttle apparatus of claim 2, wherein the button assembly comprises a pull button assembly comprising a pull button rod extending from a proximal end rigidly connected to an outer surface of the wheel axle adjustment rod to a distal end, wherein the pull button assembly further comprises a pull button dynamically engaged with the distal end of the pull button rod and configured for receiving user engagement to facilitate the user interaction with the pull button assembly.

6. The shuttle apparatus of claim 5, wherein the pull button rod is arranged in an at least substantially perpendicular configuration relative to the central rod axis of the wheel axle adjustment rod.

7. The shuttle apparatus of claim 5, wherein the pull button rod extends through the button slot of the shuttle housing such that the adjustable guide wheel assembly being rotated between the locked position and the unlocked position comprises at least a portion of the pull button rod between the proximal end and the distal end being moved between a first slot end and a second slot end of the button slot, wherein the locked position of the adjustable guide wheel assembly is defined by the pull button assembly being arranged with the pull button rod extending from the wheel axle adjustment rod in a first direction such that the pull button dynamically engaged with the distal end thereof is positioned along a first exterior surface of the shuttle housing, the first exterior surface defining at least a portion of a lower end of the shuttle housing.

8. The shuttle apparatus of claim 7, wherein the unlocked position of the adjustable guide wheel assembly is defined by the pull button assembly being arranged with the pull button rod extending from the wheel axle adjustment rod in a second direction such that the pull button dynamically engaged with the distal end thereof is positioned along a second exterior surface of the shuttle housing, wherein the second direction is at least substantially perpendicular to the first direction.

9. The shuttle apparatus of claim 5, wherein the pull button assembly further comprises a retention element configured to engage the pull button disposed outside of the shuttle housing in an at least substantially inward direction towards an exterior surface of the shuttle housing.

10. The shuttle apparatus of claim 1, further comprising:

a connector element configured to receive a fastener for operatively connecting the shuttle apparatus to a user;

wherein at least a portion of the button slot is defined at a lower end of the shuttle housing such that, upon the shuttle apparatus being installed in an upright orientation relative to the guide member, the button assembly is positioned vertically below the connector element.

11. The shuttle apparatus of claim 1, wherein rotating the adjustable guide wheel assembly between the locked position and the unlocked position comprises moving the at least a portion of the button assembly between the first slot end and the second slot end, wherein the unlocked position is defined by the at least a portion of the button assembly being disposed at the first slot end and the locked position is defined by the at least a portion of the button assembly being disposed at the second slot end.

12. The shuttle apparatus of claim 11, wherein the shuttle apparatus is configured such that the adjustable guide wheel assembly defines a range of rotational motion that extends between the locked position and the unlocked position; wherein the range of rotational motion of the adjustable guide wheel assembly is defined by an angle of rotation of at least substantially 90 degrees.

13. The shuttle apparatus of claim 11, wherein the wheel axle element is configured to rotate throughout a wheel axle range of rotational motion defined within a rotational plane, wherein the slot length of the button slot is defined within a plane that is at least substantially parallel to the rotational plane within which the wheel axle range of rotational motion is defined.

14. The shuttle apparatus of claim 11, wherein the shuttle housing further defines one or more recessed button seats at one or more of the first slot end and the second slot end of the button slot, each of the one or more recessed button seats being configured for receiving a button element of the button assembly therein and, upon the button element being positioned with the one or more recessed button seat, at least partially restricting the button from movement along the slot length of the button slot.

15. The shuttle apparatus of claim 14, wherein the one or more recessed button seats comprises a first recessed button seat disposed at the first slot end and a second recessed button seat disposed at the second slot end, the first recessed button seat being configured to at least partially secure the button element in the unlocked position and the second recessed button seat being configured to at least partially secure the button element in the locked position.

16. The shuttle apparatus of claim 11, wherein the adjustable guide wheel assembly is configured such that a rotation of the pull button assembly through a pull button angle of rotation causes the wheel axle element to rotate through a wheel axle angle of rotation that is at least substantially equivalent to the pull button angle of rotation.

17. The shuttle apparatus of claim 1, further comprising an orientation verification element dynamically engaged relative to the shuttle housing and the adjustable guide wheel assembly so as to be moveable between a disengaged position and an engaged position based at least in part on the orientation of the shuttle apparatus; wherein, in response to the shuttle being arranged in both the unlocked configuration and a vertically inverted orientation, the orientation verification element is configured to automatically move to the engaged position defined by a physical engagement of the orientation verification element with the adjustable guide wheel assembly based at least in part on one or more gravitational force; wherein the orientation verification element in the engaged position is configured to secure the adjustable guide wheel assembly in the unlocked by preventing the adjustable guide wheel assembly from rotating relative to the shuttle housing.

18. The shuttle apparatus of claim 1, further comprising a pull button assembly including a pull button arrangement indicator configured to provide a perceivable indication of a position of the adjustable guide wheel assembly based at least in part on a relative arrangement of the pull button arrangement indicator with respect to the shuttle housing.

19. The shuttle apparatus of claim 1, wherein the selective adjustment of the shuttle apparatus between the locked configuration and the unlocked configuration is defined by a dual-action, multi-directional engagement with the button assembly that causes the adjustable guide wheel assembly to be adjusted between the locked position and the unlocked position.

20. The shuttle apparatus of claim 1, wherein the locked configuration of the shuttle apparatus corresponds to effective width of adjustable guide wheel assembly being at least substantially greater than an opening width of an internal channel opening of the guide member such that the one or more guide wheels of the adjustable guide wheel assembly is configured to engage an internal channel surface of the guide member to prevent removal of the shuttle apparatus from the guide member, and the unlocked configuration of the shuttle apparatus corresponds to the effective width of adjustable guide wheel assembly being at least substantially less than the opening width of an internal channel opening of the guide member to enable movement of the shuttle apparatus through the internal channel opening to facilitate removal of the shuttle apparatus from the guide member at one or more positions along the length of the internal channel opening.

* * * * *